United States Patent
Dudar et al.

(10) Patent No.: US 10,364,762 B2
(45) Date of Patent: Jul. 30, 2019

(54) SYSTEMS AND METHODS FOR INFERRING FUEL VAPOR CANISTER LOADING RATE

(71) Applicant: Ford Global Technologies, LLC, Dearborn, MI (US)

(72) Inventors: Aed M. Dudar, Canton, MI (US); Russell Randall Pearce, Ann Arbor, MI (US); Dennis Seung-Man Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 15/688,804

(22) Filed: Aug. 28, 2017

(65) Prior Publication Data

US 2017/0356360 A1    Dec. 14, 2017

Related U.S. Application Data

(63) Continuation-in-part of application No. 14/868,101, filed on Sep. 28, 2015, now Pat. No. 9,856,805, and a continuation-in-part of application No. 14/726,033, filed on May 29, 2015, now Pat. No. 9,856,804, said application No. 14/868,101 is a continuation-in-part of application No. 14/606,704, filed on Jan. 27, 2015, now Pat. No. 9,745,907, said application No. 14/726,033 is a continuation-in-part of application (Continued)

(51) Int. Cl.
| | | |
|---|---|---|
| *F02D 41/00* | (2006.01) | |
| *F02M 25/08* | (2006.01) | |
| *F02M 35/10* | (2006.01) | |
| *F02D 41/22* | (2006.01) | |
| *B60K 15/035* | (2006.01) | |
| *B60K 15/04* | (2006.01) | |

(52) U.S. Cl.
CPC ..... *F02D 41/0032* (2013.01); *B60K 15/03519* (2013.01); *F02D 41/0045* (2013.01); *F02D 41/22* (2013.01); *F02M 25/0809* (2013.01); *F02M 25/0836* (2013.01); *F02M 35/10019* (2013.01); *B60K 2015/03514* (2013.01); *B60K 2015/0419* (2013.01); *F02D 2041/225* (2013.01)

(58) Field of Classification Search
CPC . F02D 41/0032; F02D 41/0045; F02D 41/004
See application file for complete search history.

(56) References Cited

U.S. PATENT DOCUMENTS

| | | |
|---|---|---|
| 4,887,578 A | 12/1989 | Woodcock et al. |
| 5,205,263 A | 4/1993 | Blumenstock et al. |
| 6,170,538 B1 | 1/2001 | Devall |

(Continued)

*Primary Examiner* — Timothy L Maust
*Assistant Examiner* — Timothy P. Kelly
(74) *Attorney, Agent, or Firm* — Julia Voutyras; McCoy Russell LLP

(57) ABSTRACT

Methods and systems are provided for indicating a restriction in a fuel system vapor recovery line. Responsive to such an indication, methods and systems are provided for taking mitigating actions such that an entirety of a vehicle fuel system and evaporative emissions system, including a fuel filler system, may be diagnosed as to a presence or absence of undesired evaporative emissions, even with the restriction in the vapor recovery line present. In this way, undesired evaporative emissions may be reduced or avoided, completion rates for such tests may be increased, and customer satisfaction may be improved.

6 Claims, 9 Drawing Sheets

Related U.S. Application Data

No. 14/606,704, application No. 15/688,804, which is a continuation-in-part of application No. 14/606,704.

(56) References Cited

U.S. PATENT DOCUMENTS

| | | |
|---|---|---|
| 6,907,780 B1 | 6/2005 | Meagher |
| 7,296,600 B2 | 11/2007 | Ferreria et al. |
| 7,717,095 B2 | 5/2010 | Liu |
| 7,823,610 B2 | 11/2010 | King |
| 9,546,894 B2 | 1/2017 | Dudar |
| 2016/0082832 A1 | 3/2016 | Dudar et al. |
| 2018/0023497 A1* | 1/2018 | Dudar .................. F02D 41/222 701/103 |
| 2019/0017453 A1* | 1/2019 | Dudar ................ F02D 41/0037 |

* cited by examiner

SYSTEMS AND METHODS FOR INFERRING FUEL VAPOR CANISTER LOADING RATE

CROSS REFERENCE TO RELATED APPLICATIONS

The present application is a continuation-in-part of U.S. patent application Ser. No. 14/606,704, entitled "Systems and Methods for Inferring Fuel Vapor Canister Loading Rate," filed on Jan. 27, 2015.

The present application is a continuation-in-part U.S. patent application Ser. No. 14/726,033, entitled "Systems and Methods for Inferring Fuel Vapor Canister Loading Rate," which is a continuation-in-part of U.S. patent application Ser. No. 14/606,704, filed on May 29, 2015.

The present application is a continuation-in-part U.S. patent application Ser. No. 14/868,101, entitled "Systems and Methods for Inferring Fuel Vapor Canister Loading Rate," which is a continuation-in-part of U.S. patent application Ser. No. 14/606,704 filed on Sep. 28, 2015.

The entire contents of each of the above-referenced applications are hereby incorporated by reference in their entirety for all purposes.

BACKGROUND AND SUMMARY

Vehicle emission control systems may be configured to store fuel vapors from fuel tank refueling and diurnal engine operations, and then purge the stored vapors during a subsequent engine operation. The fuel vapors may be stored in a fuel vapor canister coupled to the fuel tank which contains adsorbent material, such as activated carbon, capable of adsorbing hydrocarbon fuel vapor.

The fuel tank may be further coupled to a vapor recovery line (vapor recirculation line) which may also be coupled to the fuel vapor canister and the fuel filler neck. The vapor recovery line may be configured to circulate and/or hold a percentage of refueling vapors, thus limiting the rate of fuel vapor canister loading. Further, depending on the fuel dispenser, the fuel vapors within the vapor recovery line may be returned to the fuel dispenser, thus limiting the total fuel vapor stored within the fuel vapor canister for a given refueling event.

However, if the vapor recovery line becomes blocked, fuel vapor will not circulate through the vapor recovery line, and the canister loading rate (and total load) will increase. Unlike other blockages in the emissions control system, a blockage in the vapor recovery line may not necessarily result in pre-mature shutoff of the fuel dispenser, and may thus go undiagnosed. This may lead to an underestimation of canister load following refueling, which may in turn lead to an increase in bleed emissions if canister purge operations are not updated to accurately reflect the current canister load. While the fuel tank pressure during the refueling event can also be used to estimate the canister loading rate, the fuel tank pressure may not increase in accordance with a vapor recovery line blockage, and may thus not provide an accurate reflection of canister loading in the case of degradation.

Furthermore, in a case where the vapor recovery line is blocked or restricted, some areas of the fuel system and evaporative emissions system may become isolated from vacuum or positive pressure that is utilized to assess a presence or absence of undesired evaporative emissions stemming from the fuel system and evaporative emissions system. More specifically, if there is a restriction in the vapor recovery line, and fuel in the fuel tank is above a fuel tank spud valve, then a fuel filler system may go undiagnosed in a test where vacuum is communicated to the fuel system in order to determine the presence or absence of undesired evaporative emissions. If parts of the fuel system (e.g. fuel filler system) go undiagnosed, undesired evaporative emissions may increase.

Thus, the inventors herein have recognized the above issues, and have developed systems and methods to at least partially address them. In one example, a method is provided, comprising testing for undesired evaporative emissions from a fuel system and/or an evaporative emissions system in a first mode when a vapor recovery line, configured to circulate and/or hold a percentage of refueling vapors, is degraded as determined by a steady-state pressure in the vapor recovery line during a refueling event, and testing for the undesired evaporative emissions in a second mode when the vapor recovery line is not degraded. In one example, testing for undesired evaporative emissions from the fuel system and/or the evaporative emissions system in the first mode includes conducting the test responsive to a fuel level in a fuel tank of the vehicle below a threshold fuel level, and wherein testing for undesired evaporative emissions from the fuel system and/or the evaporative emissions system in the second mode includes conducting the test responsive to the fuel level in the fuel tank being either greater than, or less than, the threshold fuel level. For example, when the fuel level is greater than the threshold fuel level and the vapor recovery line is degraded, a portion of the fuel system is isolated from another portion of the fuel system. In one example, the portion of the fuel system that is isolated includes a fuel filler system of the fuel system. In this way, an entirety of the fuel system and evaporative emissions system may be tested for the presence or absence of undesired evaporative emissions, even under conditions where the vapor recovery line is degraded. By conducting a test for undesired evaporative emissions in the first mode when the recovery line is degraded, and conducting the test for undesired evaporative emissions in the second mode when the recovery line is not indicated to be degraded, undesired evaporative emissions may be reduced or avoided.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

DETAILED DESCRIPTION

Figure 1:
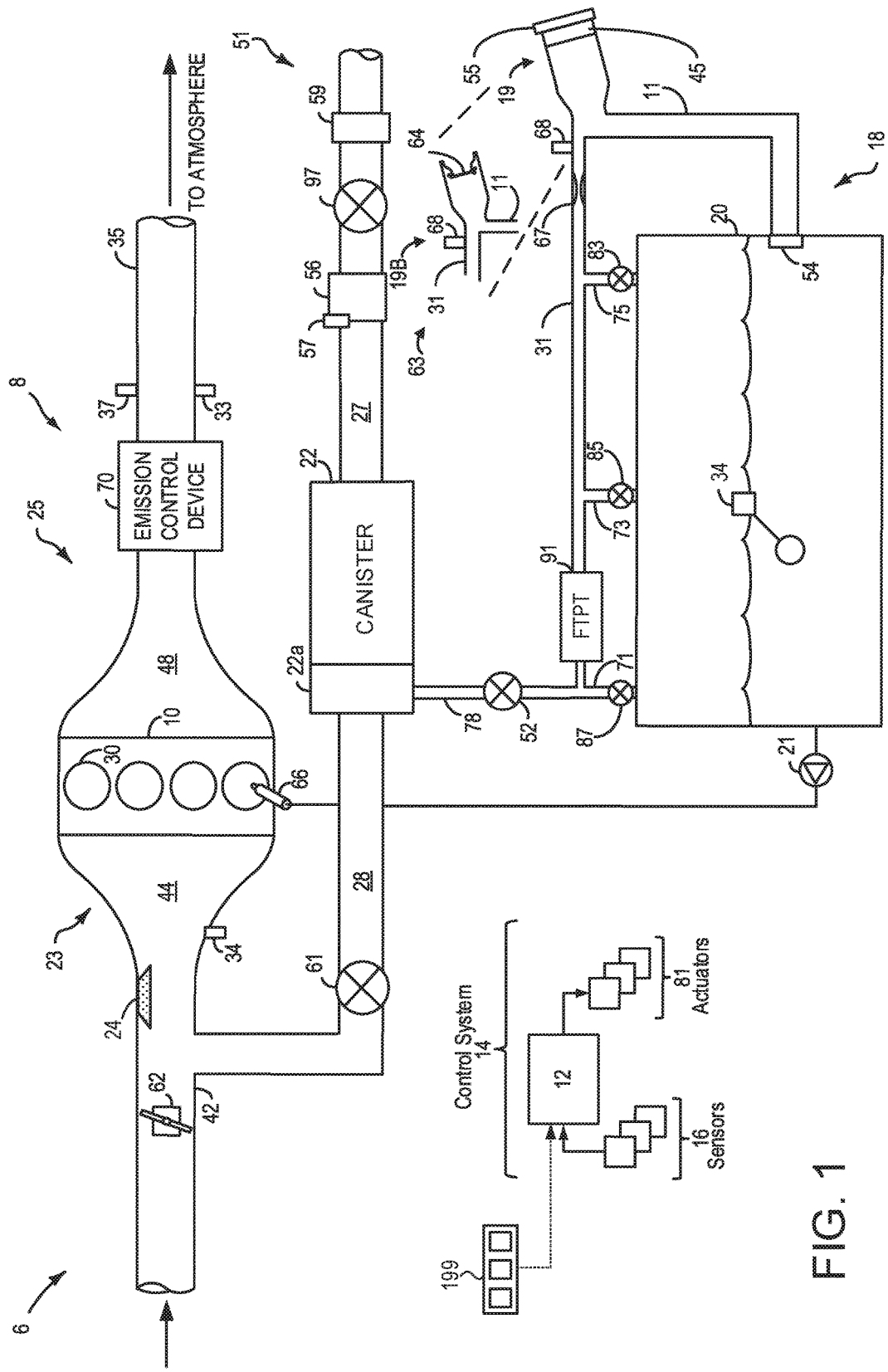
FIG. 1 shows a schematic depiction of a fuel system coupled to an engine system.
Figure 3:
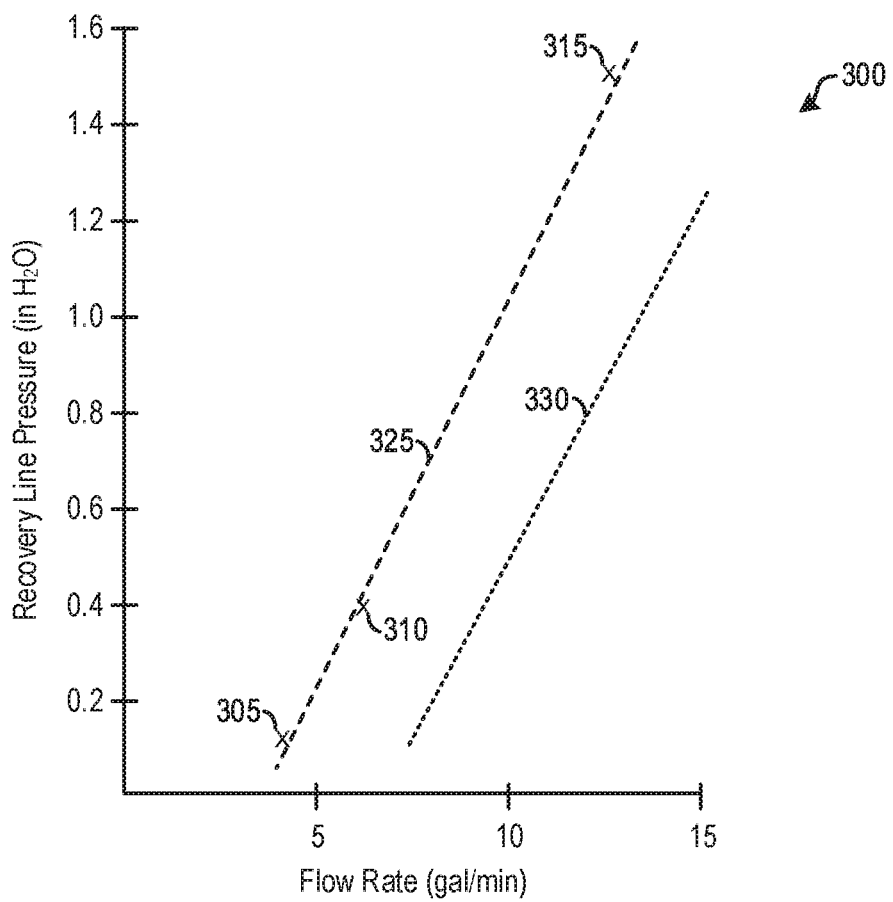
FIG. 3 shows a regression analysis plotting steady-state recovery line pressure against fuel dispensation rate.
Figure 4:
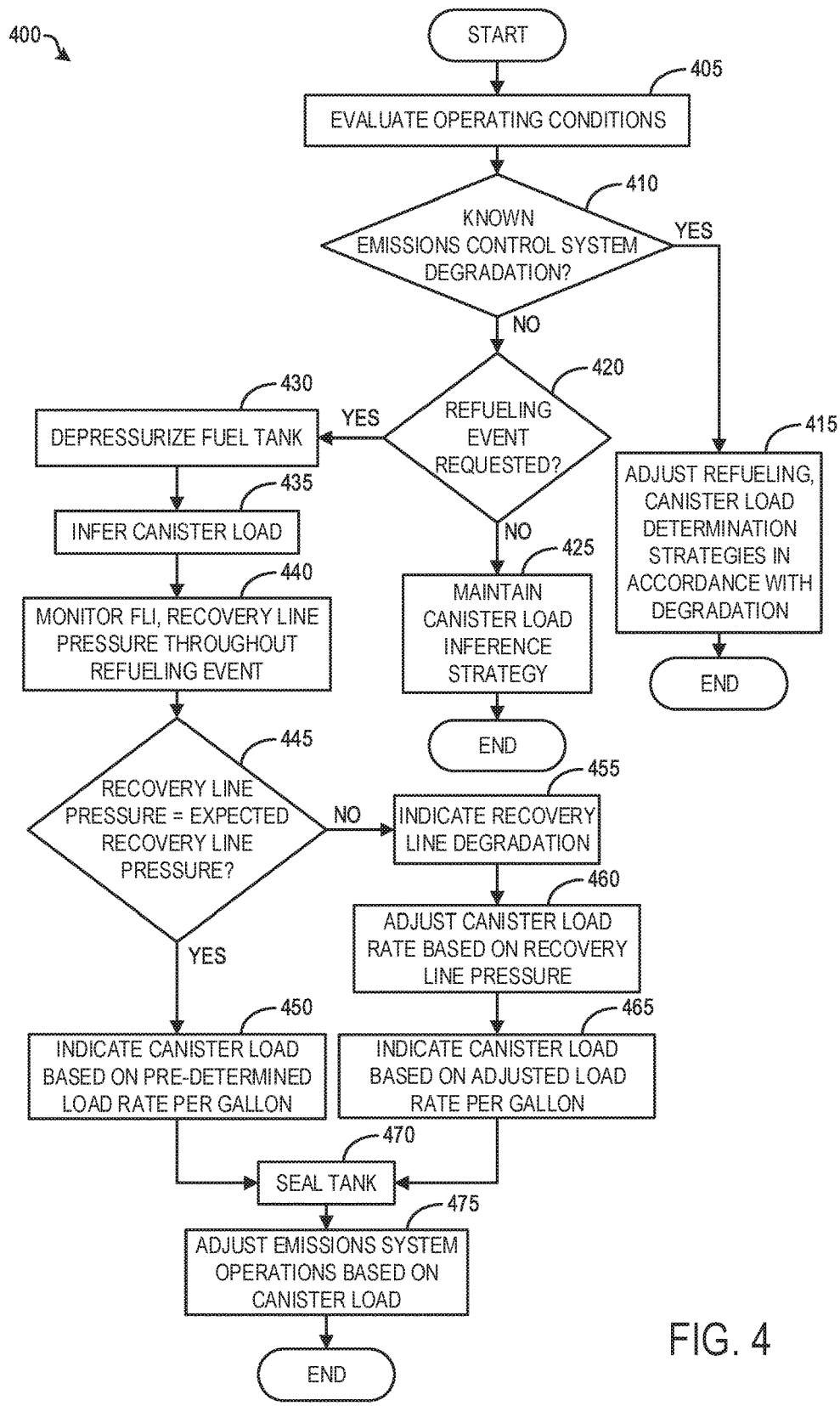
FIG. 4 shows an example method for determining a fuel vapor canister loading rate during a refueling event.
Figure 5:
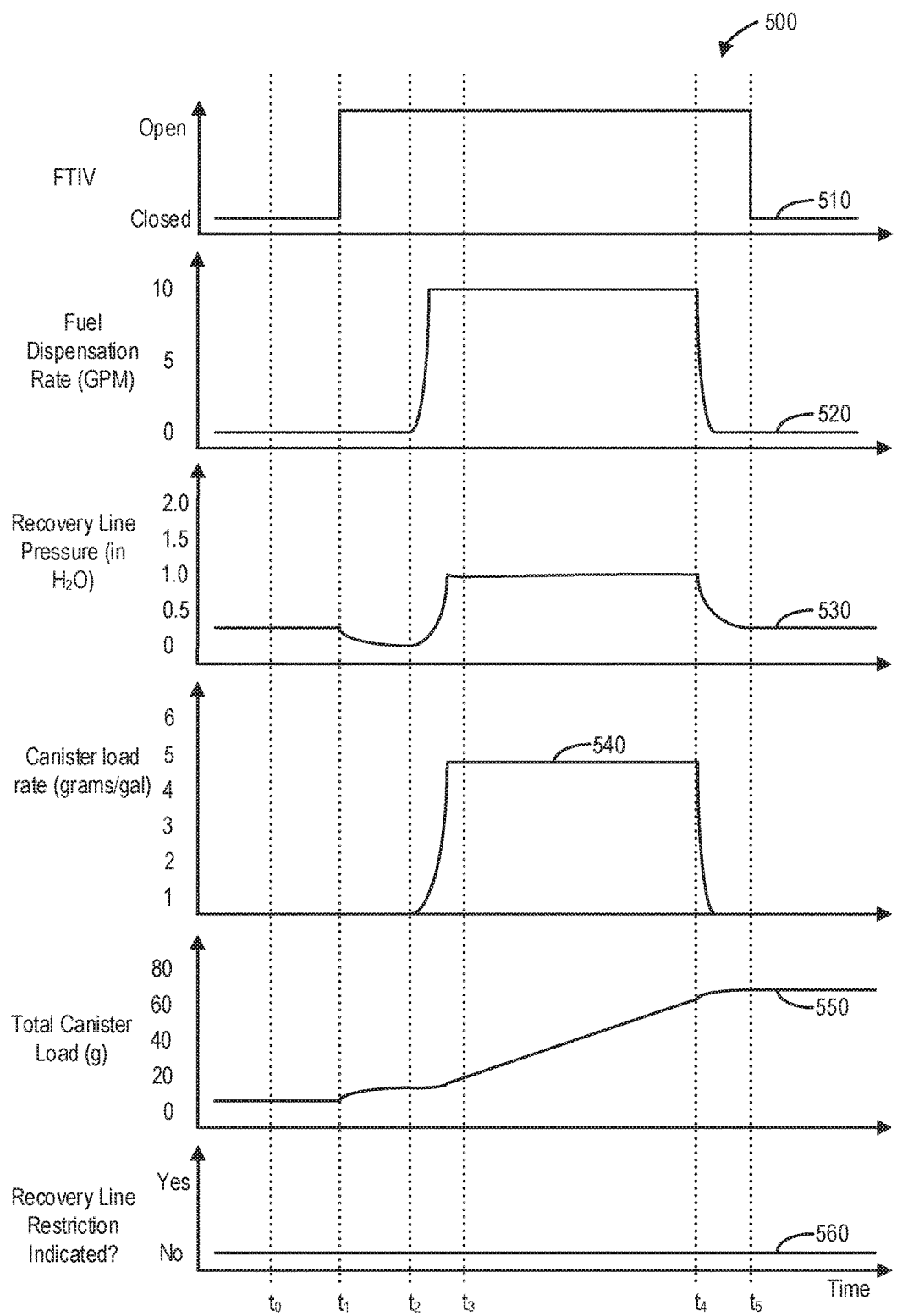
FIG. 5 shows an example timeline for a refueling event including an intact fuel vapor recovery line.
Figure 6:
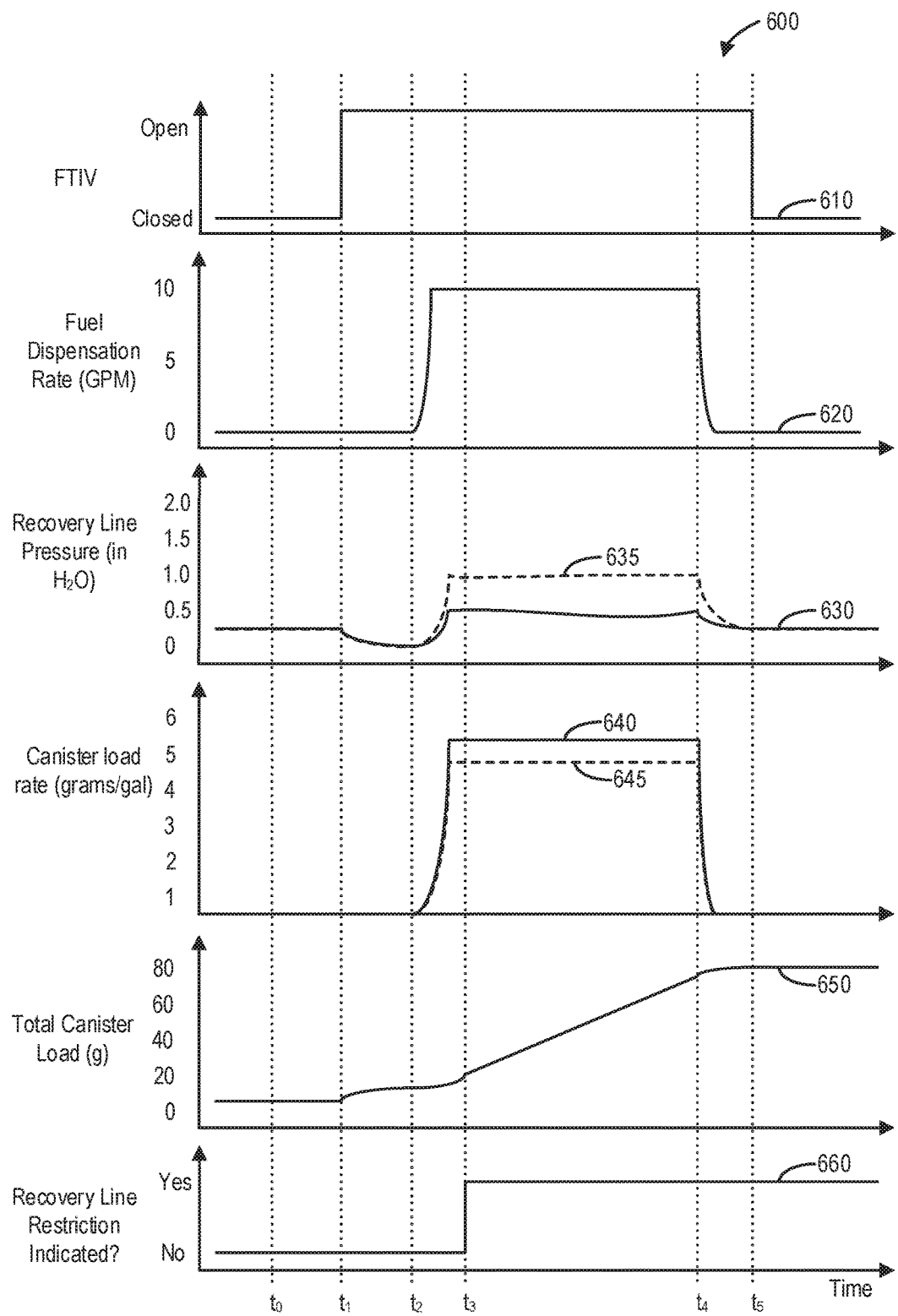
FIG. 6 shows an example timeline for a refueling event including a blocked fuel vapor recovery line.

This detailed description relates to systems and methods for inferring a fuel vapor canister load. In particular, the fuel vapor canister load may be inferred based on the steady-state pressure in a vapor recovery line during a refueling event. The fuel vapor canister may be included in a hybrid vehicle, such as a plug-in electric hybrid vehicle, as depicted in FIG. 1. During a refueling event, the steady-state pressure in the vapor recovery line increases proportionately with the fuel dispensing rate, as shown in FIGS. 2A, 2B, 2C, and 3. However, if a blockage exists within the vapor recovery line, the vapor recovery line pressure may be less than expected based on the fuel dispensing rate, as shown in FIG. 3. This relationship may be exploited to determine vapor recovery line degradation, as well as a fuel canister load rate during a refueling event. FIG. 4 shows an example method for determining fuel canister load rate during a refueling event. FIG. 5 shows an example timeline for a refueling event including an intact fuel vapor recovery line using the method of FIG. 4 applied to the system of FIG. 1. FIG. 6 shows an example timeline for a refueling event including a blocked fuel vapor recovery line using the method of FIG. 4 applied to the system of FIG. 1.

Figure 7A:
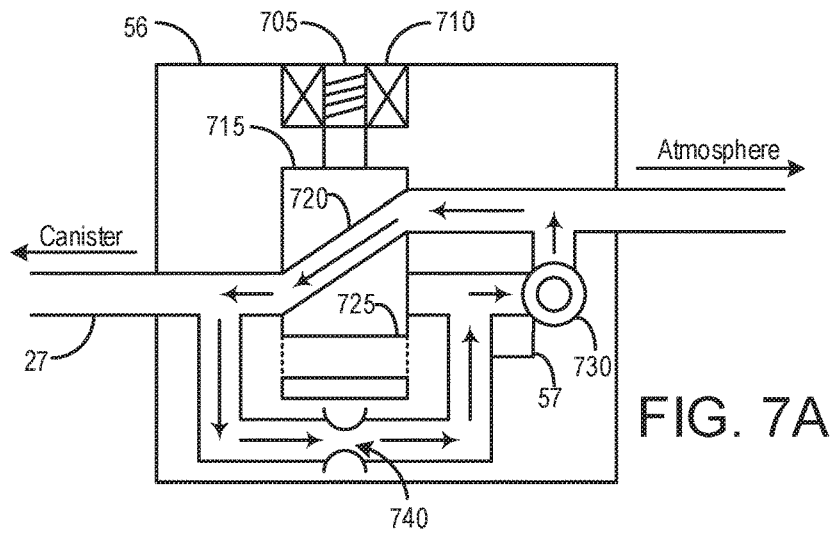
FIGS. 7A-7C show example configurations of an evaporative level check monitor (ELCM) used for conducting tests for the presence or absence of undesired evaporative emissions.
Figure 7B:
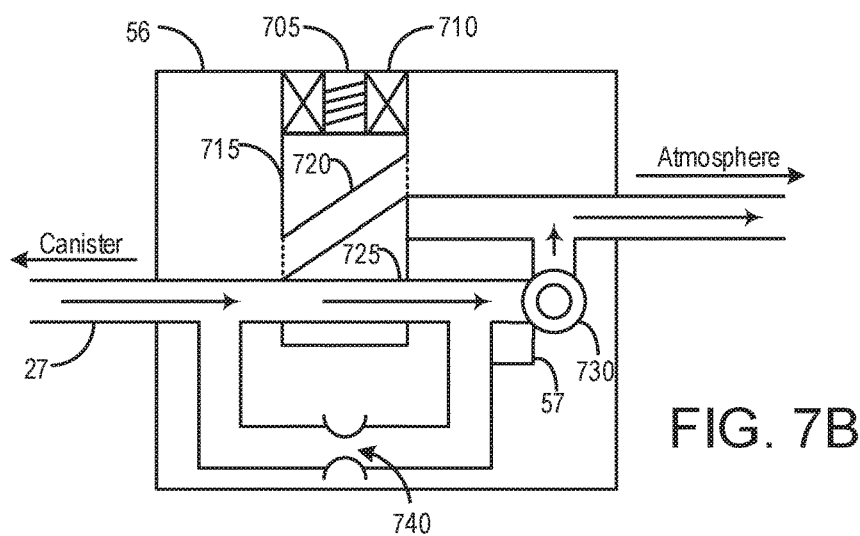
Figure 7C:
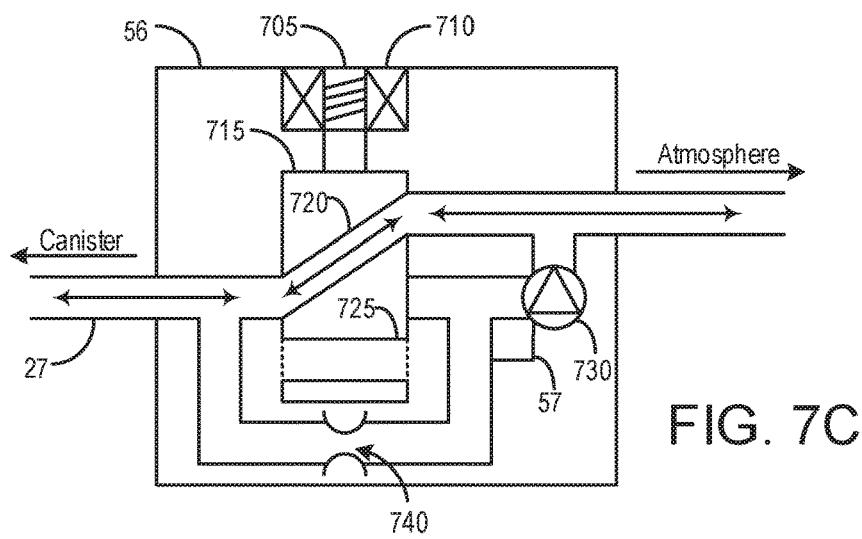

In some examples where a restriction (or degradation) is indicated in the fuel vapor recovery line, then mitigating actions may be taken to diagnose a presence or absence of undesired evaporative emissions in a fuel system and evaporative emissions system of the vehicle. More specifically, in some examples an ELCM pump may be used to evacuate the fuel system and evaporative emissions system. Various configurations of the ELCM are illustrated at FIGS. 7A-7C. In one example, depicted at FIG. 8, a method may comprise evacuating the fuel system and evaporative emissions system using the ELCM under conditions where fuel level in a fuel tank is below a spud valve, such that vacuum may effectively be communicated to the entirety of the fuel system and evaporative emissions system, including a fuel filler system. In this way, the entirety of the fuel system and evaporative emissions system, including the fuel filler system, may be diagnosed under conditions where the fuel vapor recovery line is indicated to be restricted or degraded. An example timeline for conducting such a test is illustrated at FIG. 9.

FIG. 1 shows a schematic depiction of a vehicle system 6. The vehicle system 6 includes an engine system 8 coupled to an emissions control system 51 and a fuel system 18. Emission control system 51 includes a fuel vapor container or canister 22 which may be used to capture and store fuel vapors. In some examples, vehicle system 6 may be a hybrid electric vehicle system.

The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 24 may be placed in the intake manifold of engine 10 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 24. In addition, fuel vapors stored during an engine shutdown can also be desorbed from the AIS HC during engine operation. In this way, AIS HC 24 may be continually loaded and purged, and the trap may reduce evaporative emissions from the intake passage even when engine 10 is shut down.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel system. Fuel tank 20 may hold a plurality of fuel blends, including fuel with a range of alcohol concentrations, such as various gasoline-ethanol blends, including E10, E85, gasoline, etc., and combinations thereof. A fuel level sensor 34 located in fuel tank 20 may provide an indication of the fuel level ("Fuel Level Input") to controller 12. As depicted, fuel level sensor 34 may comprise a float connected to a variable resistor. Alternatively, other types of fuel level sensors may be used.

Vapors generated in fuel system 18 may be routed to an evaporative emissions control system 51 which includes a fuel vapor canister 22 via vapor recovery line 31, before being purged to the engine intake 23. Vapor recovery line 31 may be coupled to fuel tank 20 via one or more conduits and may include one or more valves for isolating the fuel tank during certain conditions. For example, vapor recovery line 31 may be coupled to fuel tank 20 via one or more or a combination of conduits 71, 73, and 75. The vapor recovery line may be configured to hold a percentage of total fuel vapor generated during a refueling event. For example, the vapor recovery line may be configured to hold 20% of the total fuel vapor generated. By effectively increasing the vapor dome volume of the fuel tank, the recovery line may limit the rate of flow of fuel vapor to the fuel vapor canister. Depending on the configuration of the fuel dispenser, a portion of the fuel vapor held within the recovery line may be returned to the fuel dispenser.

Further, in some examples, one or more fuel tank vent valves may be deposed in conduits 71, 73, or 75. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 71 may include a grade vent valve (GVV) 87, conduit 73 may include a fill limit venting valve (FLVV) 85, and conduit 75 may include a grade vent valve (GVV) 83. Further, in some examples, recovery line 31 may be coupled to a fuel filler system 19. In some examples, fuel filler system 19 may include a fuel cap 5 for sealing off the fuel filler system from the atmosphere. Fuel filler system 19 is coupled to fuel tank 20 via a fuel filler pipe or neck 11.

In some examples, fuel filler system 19 may include a spud valve 54. Spud valve 54 may open under a threshold vacuum (e.g. negative with respect to atmospheric pressure) in the fuel tank, for example. Spud valve 54 may additionally allow fuel to be dispensed into fuel tank 20.

In still other examples, fuel filler system 19 may comprise a capless fuel filler system 19B, illustrated by inset 63. More specifically, the capless fuel filler system 19B may include a negative pressure relief valve 64 which remains closed to seal off the fuel system without a cap. For example, pressure relief valve 64 may be opened by inserting a fuel nozzle, such as a nozzle of a fuel dispensing device, into the fuel filler neck for refueling. Negative pressure relief valve 64 may release pressure in the fuel system at a preset negative pressure threshold (or vacuum threshold) to prevent too large a negative pressure forming in the fuel vapor recovery system or fuel tank. As such, negative pressure relief valve 64 may be vacuum-actuated, wherein the negative pressure relief valve is configured to open at a preset negative pressure or vacuum. The preset negative pressure threshold for activating the vacuum relief mechanism may be set at −20 in H2O, for example, or at a suitable threshold depending on the fuel tank design and configuration. The vacuum threshold may be set at a level greater than vacuum conditions typically used for fuel system evaporative emissions testing using vacuum applied via ELCM (e.g. 56 in FIG. 1), as will be discussed in further detail below. Briefly, the vacuum threshold may be set above −12 in $H_2O$, for example, or at a suitable level depending on the configuration of ELCM 56. In this way, an ELCM testing cycle for the presence or absence of undesired evaporative emissions may not trigger the vacuum relief mechanism (which may cause a false fail result).

Vapor recovery line 31 may include one or more orifices 67. For example, each orifice may be on the order of 2-3.5 mm in diameter, but may be smaller or larger in diameter in some examples. Each orifice may have an equal diameter, or the diameters may vary across orifices. Vapor recovery line 31 may further include one or more vapor recovery line pressure sensors 68.

Fuel filler system 19 may include refueling lock 45. In some embodiments, refueling lock 45 may be a fuel cap locking mechanism. The fuel cap locking mechanism may be configured to automatically lock the fuel cap in a closed position so that the fuel cap cannot be opened. For example, the fuel cap 55 may remain locked via refueling lock 45 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 45 may be a filler pipe valve located at a mouth of fuel filler pipe (fuel filler neck) 11. In such embodiments, refueling lock 45 may not prevent the removal of fuel cap 55. Rather, refueling lock 45 may prevent the insertion of a refueling pump into fuel filler pipe (fuel filler neck) 11. The filler pipe valve may be electrically locked, for example by a solenoid, or mechanically locked, for example by a pressure diaphragm.

In some embodiments, refueling lock 45 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 45 is locked using an electrical mechanism, refueling lock 45 may be unlocked by commands from controller 12, for example, when a fuel tank pressure decreases below a pressure threshold. In embodiments where refueling lock 45 is locked using a mechanical mechanism, refueling lock 45 may be unlocked via a pressure gradient, for example, when a fuel tank pressure decreases to atmospheric pressure.

Emissions control system 51 may include one or more emissions control devices, such as one or more fuel vapor canisters 22 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 51 may further include a canister ventilation path or vent line 27 which may route gases out of the canister 22 to the atmosphere when storing, or trapping, fuel vapors from fuel system 18.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Vent line 27 may also allow fresh air to be drawn into canister 22 when purging stored fuel vapors from fuel system 18 to engine intake 23 via purge line 28 and purge valve 61. For example, purge valve 61 may be normally closed but may be opened during certain conditions so that vacuum from engine intake manifold 44 is provided to the fuel vapor canister for purging. In some examples, vent line 27 may include an air filter 59 disposed therein upstream of a canister 22.

In some examples, the flow of air and vapors between canister 22 and the atmosphere may be regulated by a canister vent valve coupled within vent line 27. When included, the canister vent valve may be a normally open valve, so that fuel tank isolation valve 52 (FTIV) may control venting of fuel tank 20 with the atmosphere. FTIV 52 may be positioned between the fuel tank and the fuel vapor canister within conduit 78. FTIV 52 may be a normally closed valve, that when opened, allows for the venting of fuel vapors from fuel tank 20 to canister 22. Fuel vapors may then be vented to atmosphere, or purged to engine intake system 23 via canister purge valve 61.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 52 while closing canister purge valve (CPV) 61 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 52, while maintaining canister purge valve 61 closed, to depressurize the fuel tank before allowing enabling fuel to be added therein. As such, isolation valve 52 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 61 while closing isolation valve 52. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 12 may comprise a portion of a control system 14. Control system 14 is shown receiving information from a plurality of sensors 16 (various examples of which are described herein) and sending control signals to a plurality of actuators 81 (various examples of which are described herein). As one example, sensors 16 may include universal exhaust gas oxygen (UEGO) sensor 37 located upstream of the emission control device, temperature sensor 33, pressure sensor 91, and canister temperature sensor 43. Other sensors such as pressure, temperature, air/fuel ratio, and composition sensors may be coupled to various locations in the vehicle system 6. As another example, the actuators may include fuel injector 66, throttle 62, fuel tank isolation valve 52, pump 730, and refueling lock 45. The control system 14 may include a controller 12.

The controller may be shifted between sleep and wake-up modes for additional energy efficiency. During a sleep mode the controller may save energy by shutting down on-board sensors, actuators, auxiliary components, diagnostics, etc. Essential functions, such as clocks and controller and battery maintenance operations may be maintained on during the sleep mode, but may be operated in a reduced power mode. During the sleep mode, the controller will expend less current/voltage/power than during a wake-up mode. During the wake-up mode, the controller may be operated at full power, and components operated by the controller may be operated as dictated by operating conditions.

In some examples, the controller may be placed in a sleep mode following a vehicle-off event in order to perform a diagnostic routine (e.g. test for undesired evaporative emissions) at a duration after the vehicle-off event. The controller may have a wake input that allows the controller to be returned to an awake mode based on an input received from one or more sensors or timers. For example, particularly with regard to the method depicted in FIG. 8, the controller may need to be awake in order to conduct such methods. In such an example, the controller may stay awake for a duration referred to as a time period where the controller is maintained awake to perform extended shutdown functions, such that the controller may be awake to conduct evaporative emissions test diagnostic routines. In another example, a wakeup capability may enable a circuit to wake the controller when conditions are indicated to be met for conducting a diagnostic (e.g. ELCM-based evaporative emissions test diagnostic procedure).

The controller may receive input data from the various sensors, process the input data, and trigger the actuators in response to the processed input data based on instruction or code programmed therein corresponding to one or more routines. An example control routine is described herein and with regard to FIG. 4 and FIG. 8.

In some configurations, a canister vent valve (CVV) 97 may be coupled within vent line 27. CVV 97 may function to adjust a flow of air and vapors between canister 22 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 97 may be a solenoid valve wherein opening or closing of the valve is performed via actuation of a canister vent solenoid. In particular, the canister vent valve may be an open that is closed upon actuation of the canister vent solenoid. In some examples, CVV 97 may be configured as a latchable solenoid valve. In other words, when the valve is placed in a closed configuration, it latches closed without requiring additional current or voltage. For example, the valve may be closed with a 100 ms pulse, then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

Evaporative emissions detection routines may be intermittently performed by controller 12 on evaporative emissions system 51 and/or fuel system 18 to confirm that an undesired amount of evaporative emissions are not being released from the fuel system and/or evaporative emissions control system. As such, evaporative emissions detection routines may be performed while the engine is off (engine-off evaporative emissions test) using engine-off natural vacuum (EONV) generated due to a change in temperature and pressure at the fuel tank following engine shutdown and/or with vacuum supplemented from a vacuum pump.

Alternatively, evaporative emissions detection routines may be performed while the engine is running by using engine intake manifold vacuum. In other examples, evaporative emissions detection routines may be performed while the engine is running via the vacuum pump. For example, evaporative emissions tests may be performed by an evaporative level check module (ELCM) 56 communicatively coupled to controller 12. ELCM 56 may be coupled in vent line 27, between canister 22 and the atmosphere. ELCM 56 may include a vacuum pump (see 730 at FIGS. 7A-7C) for applying negative pressure to the fuel system when administering an evaporative emissions test. In some embodiments, the vacuum pump may be configured to be reversible. In other words, the vacuum pump may be configured to apply either a negative pressure or a positive pressure on the fuel system. ELCM 56 may further include a reference orifice (see 740 at FIGS. 7A-7C) and a pressure sensor 57. For example, a pump in the module may evacuate a small volume of air from the emission control system and/or fuel system through a reference orifice in the module to obtain a reference pressure. The pump may then be operated to generate decreasing pressure in the emission control system and/or fuel system, which may be monitored by the controller and undesired evaporative emissions may be indicated in response to the pressure in the fuel system and/or emission control system remaining above an adjusted reference pressure, where the adjusted reference pressure is based on an actual size or diameter of the reference orifice in the ELCM. It may be understood that in examples where ELCM 56 is included in the vehicle, CVV 97 may not be included in the vehicle.

Turning now to FIGS. 7A-7C, example illustrations are shown for controlling an ELCM 56. More specifically, FIGS. 7A-7C show a schematic depiction of an example ELCM 56 in various configurations in accordance with the present disclosure. As shown in FIG. 1, ELCM may be located along vent line 27. ELCM 56 includes a changeover valve (COV) 715, a pump 730, and a pressure sensor 57. Pump 730 may be a vane pump, however other pump configurations have additionally been contemplated. The COV may be moveable between a first a second position. In the first position, as shown in FIGS. 7A and 7C, air may flow through the ELCM via first flow path 720. In the second position, as shown in FIG. 7B, air may flow through the ELCM via second flow path 725. The position of the COV may be controlled by solenoid 710 via compression spring 705. The ELCM may also comprise reference orifice 740. The reference orifice may have a diameter corresponding to the size of a threshold orifice size to be tested, for example, 0.02". In either the first or second position, pressure sensor 57 may generate a pressure signal reflecting the pressure within the ELCM. Operation of the COV and solenoid may be controlled via signals received from controller 12.

As shown in FIG. 7A, the COV is in the first position, and the pump is activated. Air flow through the ELCM in this configuration is represented by arrows. In this configuration, the pump may draw a vacuum on the reference orifice, and the pressure sensor 57 may record the vacuum level within the ELCM. This reference check vacuum level reading may then become the threshold for passing/failing a subsequent evaporative emissions test.

As shown in FIG. 7B, COV (e.g. 715) is in the second position, and pump (e.g. 730) is activated. If included, canister vent valve (e.g. 97) may be open, allowing the pump to draw a vacuum on fuel system (e.g. 18), however in other examples canister vent valve may not be included. In examples where the fuel system includes a FTIV (e.g. 52), the FTIV may be opened to allow the pump (e.g. 730) to draw a vacuum on the fuel tank (e.g. 20). Air flow through ELCM in this configuration is represented by arrows. In this configuration, as the pump pulls a vacuum on evaporative emissions control system (e.g. 51) and fuel system (e.g. 18), the absence of undesired evaporative emissions may allow for the vacuum level in the ELCM to reach or exceed the previously determined vacuum threshold. In the presence of undesired evaporative emissions stemming from a site larger than the reference orifice, the pump may not pull down to the reference check vacuum level.

As shown in FIG. 7C, COV (e.g. 715) is in the first position, and pump (e.g. 730) is deactivated. Canister vent valve (if included) is open, allowing for air to freely flow between atmosphere and the canister, such as during a canister purging operation wherein canister purge valve (e.g. 61) is open and intake manifold vacuum may draw air through the ELCM and fuel vapor canister (e.g. 22), thus resulting in the desorption of fuel vapors to engine intake for combustion. In another example, the COV may be configured in the first position with the pump deactivated and canister vent valve (where included) opened during a refueling event. If equipped, a FTIV (e.g. 52) may additionally be commanded open and refueling vapors may thus be routed from the fuel tank to the fuel vapor canister to be adsorbed, prior to exiting to atmosphere via the ELCM and open canister vent valve (where included).

As discussed above, during evacuating the evaporative emissions control system (e.g. 51) and fuel system (e.g. 18) with the ELCM 56 (or alternative vacuum source such as engine intake manifold vacuum) in order to conduct an evaporative emissions test diagnostic, if any region of the evaporative emissions system or fuel system has become isolated from the applied vacuum, undesired evaporative emissions may go undetected. Accordingly, under conditions where a restriction may result in a portion or portions of the fuel system and/or evaporative emissions system becoming isolated from vacuum applied to the fuel system and/or evaporative emissions system, mitigating actions may be undertaken, as will be discussed below in detail.

Returning to FIG. 1, as mentioned, the entire evaporative emissions control system and fuel system need to be intermittently diagnosed for the presence of undesired evaporative emissions. In other words, any restricted areas may go undiagnosed. Under conditions wherein a fuel level is below the level of the spud valve 54, evacuating the fuel tank may direct vacuum through the spud valve to the fuel filler neck 11 and to either the negative pressure relief valve 64 configured in the capless fuel filler system 19B, or to a fuel cap 55 for vehicles configured with fuel filler system 19. Under such conditions, the fuel filler neck and fuel filler system may be adequately checked for undesired emissions. However, in an example situation wherein the fuel level is above the spud valve 54, the only path to the fuel filler neck 11 and fuel filler system (e.g. 19 or 19B) is via the vapor recovery line 31. If the vapor recovery line 31 is blocked or restricted, the fuel filler system (e.g. 19 or 19B) and fuel filler neck 11 may not be accessible to applied vacuum, thus any undesired evaporative emissions in these areas may go undiagnosed. As such, indicating whether the vehicle's fuel system vapor recirculation line is restricted may enable mitigating actions to be taken thereby avoiding undesired evaporative emissions going undetected in the fuel filler system (e.g. 19 or 19B) as will be discussed in greater detail below.

In some examples, the vehicle system may also include inertial sensors 199. Inertial sensors 199 may comprise one or more of the following: longitudinal, latitudinal, vertical, yaw, roll, and pitch sensors, for example.

During a refueling event, refueling vapors will be generated and diverted to the fuel vapor canister, where they will be adsorbed. As fuel is added to the fuel tank, both the fuel tank and vapor recovery line will experience an increase in vapor pressure as fuel vapor is generated. At a threshold vapor pressure the fuel dispenser is automatically shut-off. In some examples, a float valve is coupled within the fuel tank which automatically closes one or more valves upon reaching a pre-determined fuel level. In this way, the fuel vapor pressure increases rapidly as the tank fills, thus shutting the dispenser off and preventing over-filling of the fuel tank. If the refueling dispenser is configured to dispense fuel at a constant rate, both the fuel tank pressure and fuel vapor recovery line pressure will experience a steady-state pressure that is proportionate to the rate of fuel dispensation.

Figure 2A:
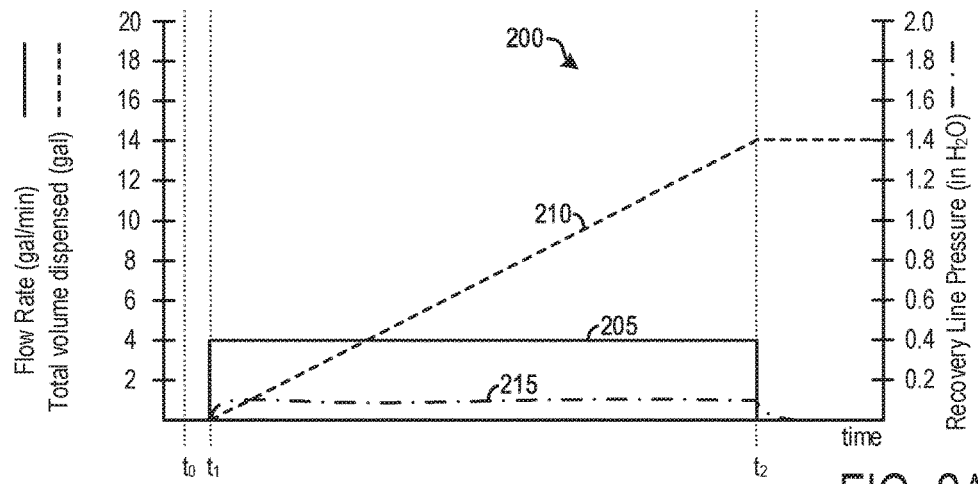
FIG. 2A shows an example timeline for a refueling event including a fuel dispensing rate of 4 gal/min.
Figure 2B:
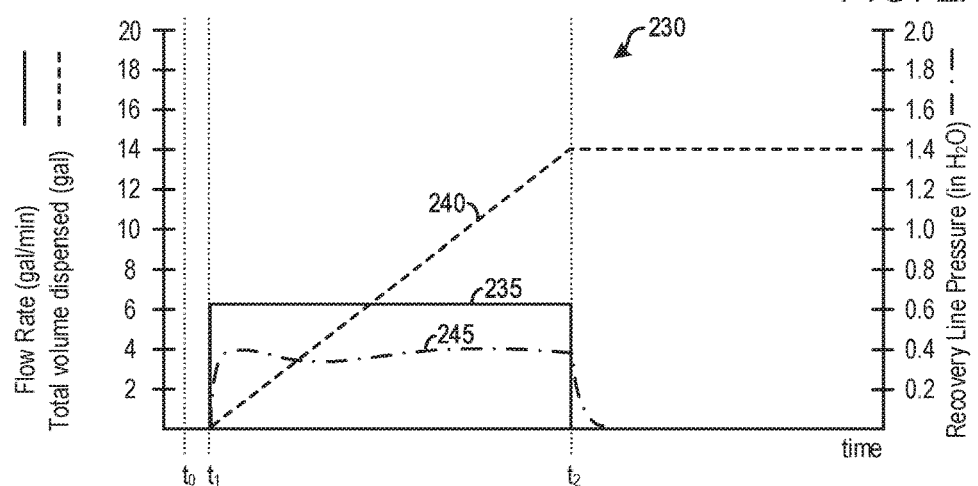
FIG. 2B shows an example timeline for a refueling event including a fuel dispensing rate of 6 gal/min.
Figure 2C:
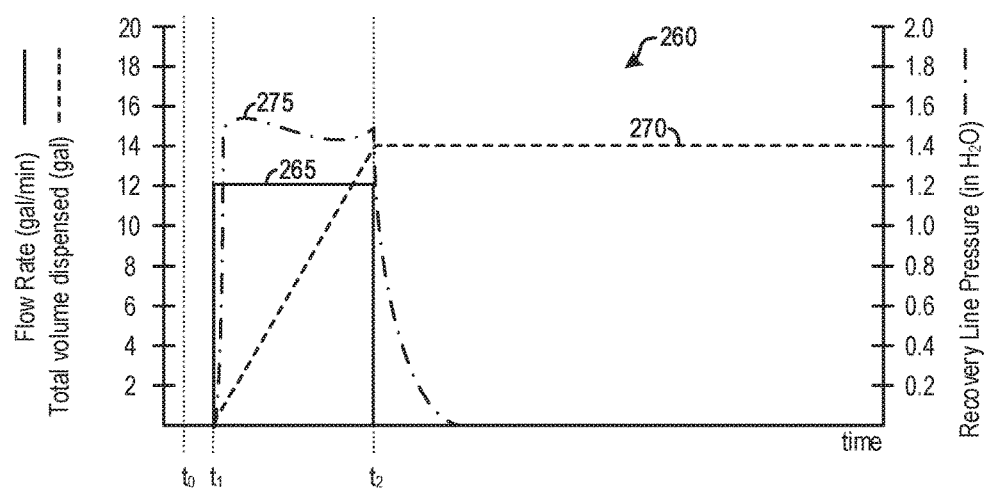
FIG. 2C shows an example timeline for a refueling event including a fuel dispensing rate of 12 gal/min.

FIGS. 2A-2C show example timelines for refueling events in accordance with the current disclosure. FIG. 2A depicts example timeline 200. Timeline 200 includes plot 205, depicting the flow rate of a liquid fuel (in gallons/min) from a fuel dispenser into a fuel tank over time. Timeline 200 further includes plot 210, showing the total volume of fuel dispensed (in gallons) into the fuel tank over time. Timeline 200 further includes plot 215, depicting vapor recovery line pressure (in in $H_2O$) over time. Gradations for flow rate and total volume of fuel dispensed are presented on the left-hand side of timeline 200, while gradations for vapor recovery line pressure are presented on the right-hand side of timeline 200.

At time $t_0$, the fuel system is in a steady state, awaiting the initiation of a refueling event. Accordingly, the vapor recovery line pressure is approximately atmospheric pressure. At time $t_1$, a refueling event begins. The fuel dispenser in this example dispenses liquid fuel at a rate of 4 gallons/min, as shown by plot 205. The total fuel dispensed into the fuel tank increases accordingly, as shown by plot 210. As shown by plot 215, the vapor recovery line pressure during the refueling event (as determined through a vapor recovery line pressure transducer) is approximately 0.12 in $H_2O$ during the steady-state period shortly following time $t_1$ through time $t_2$. At time $t_2$, the dispensation of fuel ceases, as shown by plot 210. The vapor recovery line pressure decreases, as fuel vapor diffuses to the fuel vapor canister. The refueling event then ends.

FIG. 2B depicts example timeline 230. Timeline 230 includes plot 235, depicting the flow rate of a liquid fuel (in gallons/min) from a fuel dispenser into a fuel tank over time. Timeline 230 further includes plot 240, showing the total volume of fuel dispensed (in gallons) into the fuel tank over time. Timeline 230 further includes plot 245, depicting vapor recovery line pressure (in in $H_2O$) over time. Gradations for flow rate and total volume of fuel dispensed are presented on the left-hand side of timeline 230, while gradations for recovery line pressure are presented on the right-hand side of timeline 230. Operating conditions for timeline 230 are equivalent to those for timeline 200, excepting for fuel dispensation rate.

At time $t_0$, the fuel system is in a steady state, awaiting the initiation of a refueling event. Accordingly, the vapor recovery line pressure is approximately atmospheric pressure. At time $t_1$, a refueling event begins. The fuel dispenser in this example dispenses liquid fuel at a rate of 6 gallons/min, as shown by plot 235. The total fuel dispensed into the fuel tank increases accordingly, as shown by plot 240. As shown by plot 245, the vapor recovery line pressure during the refueling event (as determined through a vapor recovery line pressure transducer) is approximately 0.4 in $H_2O$ during the steady-state period shortly following time $t_1$ through time $t_2$. At time $t_2$, the dispensation of fuel ceases, as shown by plot 240. The vapor recovery line pressure decreases, as fuel vapor diffuses to the fuel vapor canister. The refueling event then ends.

FIG. 2C depicts example timeline 260. Timeline 260 includes plot 265, depicting the flow rate of a liquid fuel (in gallons/min) from a fuel dispenser into a fuel tank over time. Timeline 260 further includes plot 270, showing the total volume of fuel dispensed (in gallons) into the fuel tank over time. Timeline 260 further includes plot 275, depicting vapor recovery line pressure (in in $H_2O$) over time. Gradations for flow rate and total volume of fuel dispensed are presented on the left-hand side of timeline 260, while gradations for recovery line pressure are presented on the right-hand side of timeline 260. Operating conditions for timeline 260 are equivalent to those for timelines 200 and 230, excepting for fuel dispensation rate.

At time $t_0$, the fuel system is in a steady state, awaiting the initiation of a refueling event. Accordingly, the vapor recovery line pressure is approximately atmospheric pressure. At time $t_1$, a refueling event begins. The fuel dispenser in this example dispenses liquid fuel at a rate of 12 gallons/min, as shown by plot 265. The total fuel dispensed into the fuel tank increases accordingly, as shown by plot 270. As shown by plot 275, the vapor recovery line pressure during the refueling event (as determined through a vapor recovery line pressure transducer) is approximately 1.5 in $H_2O$ during the steady-state period shortly following time $t_1$ through time $t_2$. At time $t_2$, the dispensation of fuel ceases, as shown by plot 270. The vapor recovery line pressure decreases, as fuel vapor diffuses to the fuel vapor canister. The refueling event then ends.

For a particular fuel system, the steady-state vapor recovery line pressure during refueling may thus be indicative of the flow rate of the fuel dispenser. FIG. 3 depicts an example plot 300 indicating a linear regression between steady-state vapor recovery line pressure (in in $H_2O$) and fuel flow rate (in gal/min). Plot 300 includes plot point 305, depicting the steady-state tank pressure and fuel flow rate for the 4 gal/min fuel dispenser described with regards to FIG. 2A. Plot 300 further includes plot point 310, depicting the steady-state tank pressure and fuel flow rate for the 6 gal/min fuel dispenser described with regards to FIG. 2B, and further includes plot point 315, depicting the steady-state tank pressure and fuel flow rate for the 12 gal/min fuel dispenser described with regards to FIG. 2C. Regression line 325 represents the relationship between steady-state vapor recovery line pressure and fuel flow rate for an example fuel system. During (and/or following) a refueling event, the steady-state pressure may be determined via the vapor recovery line pressure transducer, and the pressure then used to determine the fuel flow rate via an equation or lookup table stored in the vehicle controller.

However, if there is a restriction in the vapor recovery line (e.g. one or more recovery line orifices are partially or completely blocked), the vapor recovery line pressure will be decreased. Regression line 330 shows an example relationship between steady-state vapor recovery line pressure and fuel flow rate for an example fuel system where the vapor recovery line is partially restricted. For example, at a 10 gal/min flow rate, while the unrestricted vapor recovery line pressure is ~1.0 in $H_2O$, the restricted vapor recovery line pressure is ~0.5 in $H_2O$.

If the fuel level indicator is functional, and the controller is maintained on during a refueling event (such as for hybrid vehicles where the fuel tank must be depressurized via the opening of a fuel tank isolation valve prior to releasing the fuel cap locking mechanism) restrictions in the vapor recovery line may thus be determined based on the correlation between vapor recovery line pressure and fuel flow rate, as determined by the FLI over time. While a restriction between the fuel tank and the fuel vapor canister will likely result in a premature shutoff during refueling, a restriction in the vapor recovery line may not necessarily result in a premature shutoff. Thus diagnosing a restriction may not otherwise occur during a refueling event. Further, a recovery line blockage may lead to false-passes of evaporative emissions tests where the fuel cap is missing, loose, or otherwise degraded.

The rate of fuel vapor canister loading is also dependent on the percent restriction of the vapor recovery line. If the vapor recovery line is completely restricted, the canister will have to adsorb more vapors, as vapor recirculation will cease. In some cases, this could result in a failing emissions test. For example, a fuel system may be configured to load the canister at a rate of 4.7 grams of hydrocarbons per gallon of dispensed fuel. If the recirculation line is designed to hold 20% of the fuel vapor generated during refueling, the same system would load the canister at a rate of 6.0 grams of fuel vapor per gallon of dispensed fuel. As shown in FIG. 3, the percent of restriction may be determined based on the correlation between fuel flow rate and vapor recovery line pressure. The restriction percentage may then be used to determine the rate of fuel vapor canister loading. Although the fuel tank pressure sensor may also be used to infer the rate of fuel vapor canister loading, a restriction in the vapor recovery line would not be factored in to that estimate, and the canister load rate may be underestimated.

FIG. 4 shows a flow chart for an example high-level method 400 for inferring a fuel vapor canister loading rate during a refueling event. In particular, method 400 relates to inferring a fuel vapor canister loading rate based on a vapor recovery line pressure. Method 400 will be described herein with reference to the components and systems depicted in FIG. 1, though it should be understood that the method may be applied to other systems without departing from the scope of this disclosure. Method 400 may be carried out by controller 12, and may be stored as executable instructions in non-transitory memory.

Method 400 may begin at 405. At 405, method 400 may include evaluating operating conditions. Operating conditions may include, but are not limited to, fuel tank pressure, ambient temperature, engine operating status, vehicle location (as determined through an on-board GPS, for example), etc. Operating conditions may be measured by one or more sensors 16 coupled to controller 12, or may be estimated or inferred based on available data.

Continuing at 410, method 400 may include determining whether emissions control system degradation is known. Determining whether emissions control system degradation is known may include retrieving emissions control test results and/or flags, degradation indicators, etc. from the controller. Emissions control system degradation may include, faulty valves, blockages, canister restrictions, etc. If emissions control system degradation is known, method 400 may proceed to 415. At 415, method 400 may include adjusting refueling and/or canister load determination strategies in accordance with the known degradation. For example, a known blockage may lead to a strategy for refueling including a fuel tank depressurization routine that comprises an alternative route for fuel vapor and/or air stripped of fuel vapor in order to avoid the site of degradation. In another example, a canister load determination strategy may increase or decrease the expected canister load rate based on the type and location of degradation. Method 400 may then end.

If there is no known emissions control system degradation, method 400 may proceed to 420. At 420, method 400 may include determining whether a refueling event has been requested. For example, hybrid vehicle 6 may comprise a refueling request button located on the vehicle dashboard. Detecting depression of the refueling request button may indicate that a refueling event is imminent. In other examples, determining whether a refueling event is imminent may include detecting proximity to a refueling station. For example, the vehicle's proximity to a refueling station may be determined via an on-board GPS or through wireless communication between the vehicle and a refueling pump. In other examples, a refueling event may be inferred by the vehicle operator (or a refueling attendant) opening a refueling door or otherwise attempting to gain access to fuel filler system 19.

If no refueling event is requested, method 400 may proceed to 425. At 425, method 400 may include maintaining the current canister load inference strategy, and may further include indicating the current canister load. Method 400 may then end.

If a refueling event is requested, method 400 may proceed to 430. At 430, method 400 may include depressurizing the fuel tank. Depressurizing the fuel tank may include opening (or maintaining open) CVV 97, closing (or maintaining closed) CPV 61, and then opening FTIV 52. However, other fuel tank depressurizing strategies may be used depending on the fuel system configuration and the current operating conditions. For example, if the fuel tank pressure is above a threshold, a step-wise or gradual depressurization strategy may be used in order to prevent corking shut of the fill-limit vent valve and grade vent valves. Depressurizing the fuel tank may result in fuel vapor being vented to fuel vapor canister 22. However, in examples where the fuel tank contains a vacuum, depressurizing the fuel tank may result in fresh air being drawn into the fuel tank via the fuel vapor canister, which may result in some fuel vapor being desorbed from the fuel vapor canister and drawn into the fuel tank. Once the fuel tank has been depressurized, the refueling lock may be unlocked, allowing access to the fuel filler neck.

Continuing at 435, method 400 may include inferring the current canister load. Inferring the current canister load may include determining the canister load prior to the fuel tank depressurization, determining the net change of canister load during the fuel tank depressurization, and summing the prior canister load and the net change. Canister load changes may be determined based on canister temperature changes, as adsorption is an exothermic reaction and desorption is an endothermic reaction. Canister load changes may be determined based on fuel tank pressure prior to and following venting of the fuel tank to the fuel vapor canister. During canister purge operations, canister load changes may be determined based on changes in A/F ratio at engine intake and/or at an exhaust oxygen sensor. Canister loading and unloading amounts may also be determined by one or more hydrocarbon sensors coupled within the emissions control system.

Once the pre-refueling canister load has been inferred, method 400 may proceed to 440. At 440, method 400 may include monitoring the fuel level indicator (FLI) and the vapor recovery line pressure throughout the refueling event. In some examples, the fuel tank pressure may also be monitored throughout the refueling event. Data from the fuel level indicator may be used to determine a fuel dispensation rate over time. In some examples, the fuel dispensation rate may be determined based on the fuel tank pressure, and/or may be determined through communication between the controller and the fuel dispenser (e.g., output of a wireless signal from the fuel dispenser indicating the fuel dispensation rate).

Based on the fuel dispensation rate, an expected recovery line pressure may be determined. The expected recovery line pressure may be further based on ambient and operating conditions, such as ambient temperature, bulk fuel temperature, barometric pressure, fuel composition, etc. Continuing at 445, method 400 may include determining whether the steady-state vapor recovery line pressure is equal to (and/or within a threshold of) the expected vapor recovery line pressure. As described with regard to FIG. 3, a restriction in the recovery line may lead to a decrease in the pressure seen in the vapor recovery line during the refueling event. If the realized vapor recovery line pressure is equal to the expected vapor recovery line pressure for the determined fuel dispensation rate, method 400 may proceed to 450. At 450, method 400 may include indicating the canister load based on a pre-determined canister load rate per gallon of fuel dispensed (e.g. 4.7 grams/gallon). For example, the pre-determined canister load rate may be used to determine the amount of fuel vapor adsorbed by the canister during the refueling event. This amount may then be added to the canister load inferred prior to the refueling event to determine the current canister load. Indicating the canister load may include recording the determined canister load at controller 12.

If the realized vapor recovery line pressure is not equal to the expected vapor recovery line pressure for the determined fuel dispensation rate, method 400 may proceed to 455. At 455, method 400 may include indicating vapor recovery line degradation. Indicating recovery line degradation may include setting a flag at the controller, and may further include illuminating a malfunction indicator lamp (MIL). The flag set at the controller may include information regarding the percent of degradation (e.g., partially blocked, completely blocked, etc.). The indication of degradation may be accompanied by adjustments to other fuel system operations. For example, the canister purge schedule may be adjusted in order to reduce the canister load prior to a refueling event so as to increase the canister capacity in order to accommodate a greater quantity of refueling vapors.

Continuing at 460, method 400 may include adjusting the canister load rate based on the steady-state vapor recovery line pressure. For example, the canister loading rate may be determined by the following equation:

Adjusted Load Rate=Pre-Determined Load Rate+
(Restriction %)*(Maximum Load Rate−Pre-Determined Load Rate)

For example, if the Pre-Determined Load Rate is 4.7 grams/gal, the Maximum Load Rate (assuming no circulation through the vapor recovery line) is 6.0 grams/gal (vapor recovery line holds ~20% of the refueling vapors), and the Restriction % is 50% (e.g., vapor recovery line pressure is 0.5*Expected vapor recovery line pressure), the Adjusted Load Rate would be 4.7+0.5*1.3 or 5.35 grams/gal.

Continuing at 465, method 400 may include indicating the canister load based on the adjusted canister load rate per gallon of fuel dispensed. For example, the adjusted canister load rate may be used to determine the amount of fuel vapor adsorbed by the canister during the refueling event. This amount may then be added to the pre-refueling canister load to determine the current canister load. Indicating the canister load may include recording the determined canister load at controller 12.

Once the canister load has been indicated (whether based on the pre-determined load rate or the adjusted load rate) method 400 may proceed to 470. At 470, method 400 may include sealing the fuel tank (e.g., closing the FTIV). Continuing at 475, method 400 may include adjusting emissions system operations based on the canister load. For example, the canister purge schedule and/or purging thresholds may be adjusted. In some examples, the fuel tank venting schedule and/or venting thresholds may be adjusted. In some examples, canister maintenance operations during a prolonged vehicle soak may be adjusted (e.g. canister vent valve may be commanded closed, vehicle-off canister maintenance operations may be updated, etc.). Further, emissions system testing schedules and/or thresholds may be adjusted based on the canister load. Other systemic operations and thresholds may be adjusted based on the increased canister load following refueling, and further based on strategies to maintain hydrocarbons within the canister and prevent bleed emissions. Method 400 may then end.

FIG. 5 depicts an example timeline 500 for a refueling event in a hybrid vehicle comprising an intact vapor recovery line, using the method described herein and with regard to FIG. 4 as applied to the system described herein and with regard to FIG. 1. Timeline 500 includes plot 510, indicating the status of a fuel tank isolation valve (FTIV) over time. Timeline 500 further includes plot 520, indicating a fuel dispensation rate over time in gallons per minute. Timeline 500 further includes plot 530, indicating a vapor recovery line pressure over time in inches of $H_2O$. Timeline 500 further includes plot 540, indicating a canister load rate over time in grams per gallon, and plot 550, indicating a total canister load over time in grams. Timeline 500 further includes plot 560 indicating whether a vapor recovery line restriction is indicated over time.

At time $t_0$, the refueling and emissions control systems are at rest. Accordingly, the FTIV is closed, as indicated by plot 510. The recovery line pressure is slightly above atmospheric pressure, as indicated by plot 530, and the canister is relatively empty (~10 g of hydrocarbons adsorbed out of an 80 g capacity). At time $t_1$, a refueling request is received (not shown). Accordingly, the FTIV is opened, depressurizing the fuel tank. The recovery line pressure decreases to atmosphere, while the total canister load increases based on the fuel vapor stored in the fuel tank, as indicated by plot 550.

At time $t_2$, the refueling event begins. The fuel dispensation rate rapidly increases, as does the vapor recovery line pressure. The canister load rate also increases, as shown by plot 540. Accordingly, the total canister load begins increasing. At time $t_3$, the steady-state portion of the refueling event is reached. The steady-state fuel dispensation rate is ~10 gal/min, and the steady-state vapor recovery line pressure is 1.0 in $H_2O$. As shown in FIG. 3, this vapor recovery line pressure is equal to the expected pressure for a 10 gal/min fuel dispensation rate for the described system. Accordingly, the canister load rate is the pre-determined rate of 4.7 g/gal. No vapor recovery line restriction is indicated, as shown by plot 560, and the total canister load increases linearly at rate of 4.7 g/gal.

At time $t_4$, the refueling event ends. The fuel dispensation rate returns to zero. The vapor recovery line pressure decreases, as fuel vapor diffuses towards the fuel vapor canister. The canister load rate decreases, and the total canister load increases at a slower rate than during the steady-state conditions. At time $t_5$, the FTIV is closed. The recovery line pressure and canister load are thus held constant.

FIG. 6 depicts an example timeline 600 for a refueling event in a hybrid vehicle comprising a restricted vapor recovery line, using the method described herein and with regard to FIG. 4 as applied to the system described herein and with regard to FIG. 1. Timeline 600 includes plot 610, indicating the status of a fuel tank isolation valve (FTIV) over time. Timeline 600 further includes plot 620, indicating a fuel dispensation rate over time in gallons per minute. Timeline 600 further includes plot 630, indicating a vapor recovery line pressure over time in inches of $H_2O$. Plot 635 indicates the vapor recovery line pressure over time for the example shown in FIG. 5 (plot 530). Timeline 600 further includes plot 640, indicating a canister load rate over time in grams per gallon. Plot 635 indicates the canister load rate over time for the example shown in FIG. 5 (plot 540). Timeline 600 further includes plot 650, indicating a total canister load over time in grams, and plot 660 indicating whether a vapor recovery line restriction is indicated over time.

At time $t_0$, the refueling and emissions control systems are at rest. Accordingly, the FTIV is closed, as indicated by plot 610. The recovery line pressure is slightly above atmospheric pressure, as indicated by plot 630, and the canister is relatively empty (~10 g of hydrocarbons adsorbed vs an 80 g capacity). At time $t_1$, a refueling request is received (not shown). Accordingly, the FTIV is opened, depressurizing the fuel tank. The recovery line pressure decreases to atmosphere, while the total canister load increases based on the fuel vapor stored in the fuel tank, as indicated by plot 650.

At time $t_2$, the refueling event begins. The fuel dispensation rate rapidly increases, as does the vapor recovery line pressure. The canister load rate also increases, as shown by plot 640. Accordingly, the total canister load begins increasing. At time $t_3$, the steady-state portion of the refueling event is reached. The steady-state fuel dispensation rate is ~10 gal/min, and the steady-state vapor recovery line pressure is 0.5 in $H_2O$. As shown by plot 635, this vapor recovery line pressure is less than the expected pressure for a 10 gal/min fuel dispensation rate for the described system (1.0 in $H_2O$). Accordingly, the canister load rate in this example is the adjusted rate of 5.35 g/gal, greater than the expected loading rate of 4.7 g/gal as indicated by plot 645. A vapor recovery line restriction is indicated, as shown by plot 560, and the total canister load increases linearly at rate of 5.35 g/gal.

At time $t_4$, the refueling event ends. The fuel dispensation rate returns to zero. The vapor recovery line pressure decreases, as fuel vapor diffuses towards the fuel vapor canister. The canister load rate decreases, and the total canister load increases at a slower rate than during the steady-state conditions. At time $t_5$, the FTIV is closed. The recovery line pressure and canister load are thus held constant.

Figure 8:
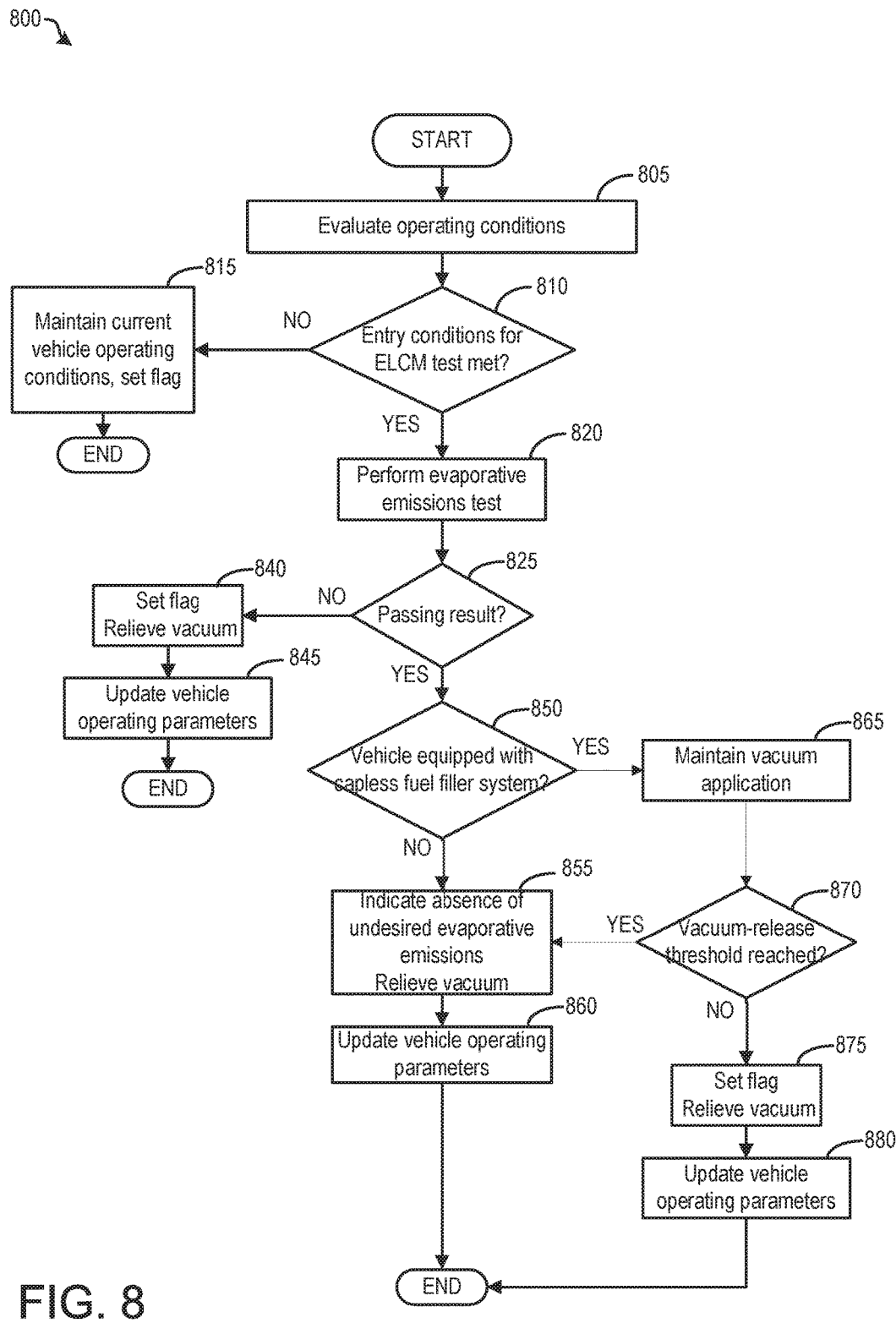
FIG. 8 shows an example method for conducting an evaporative emissions test diagnostic using an ELCM, under conditions where a restriction is indicated in a fuel vapor recovery line.
Figure 9:
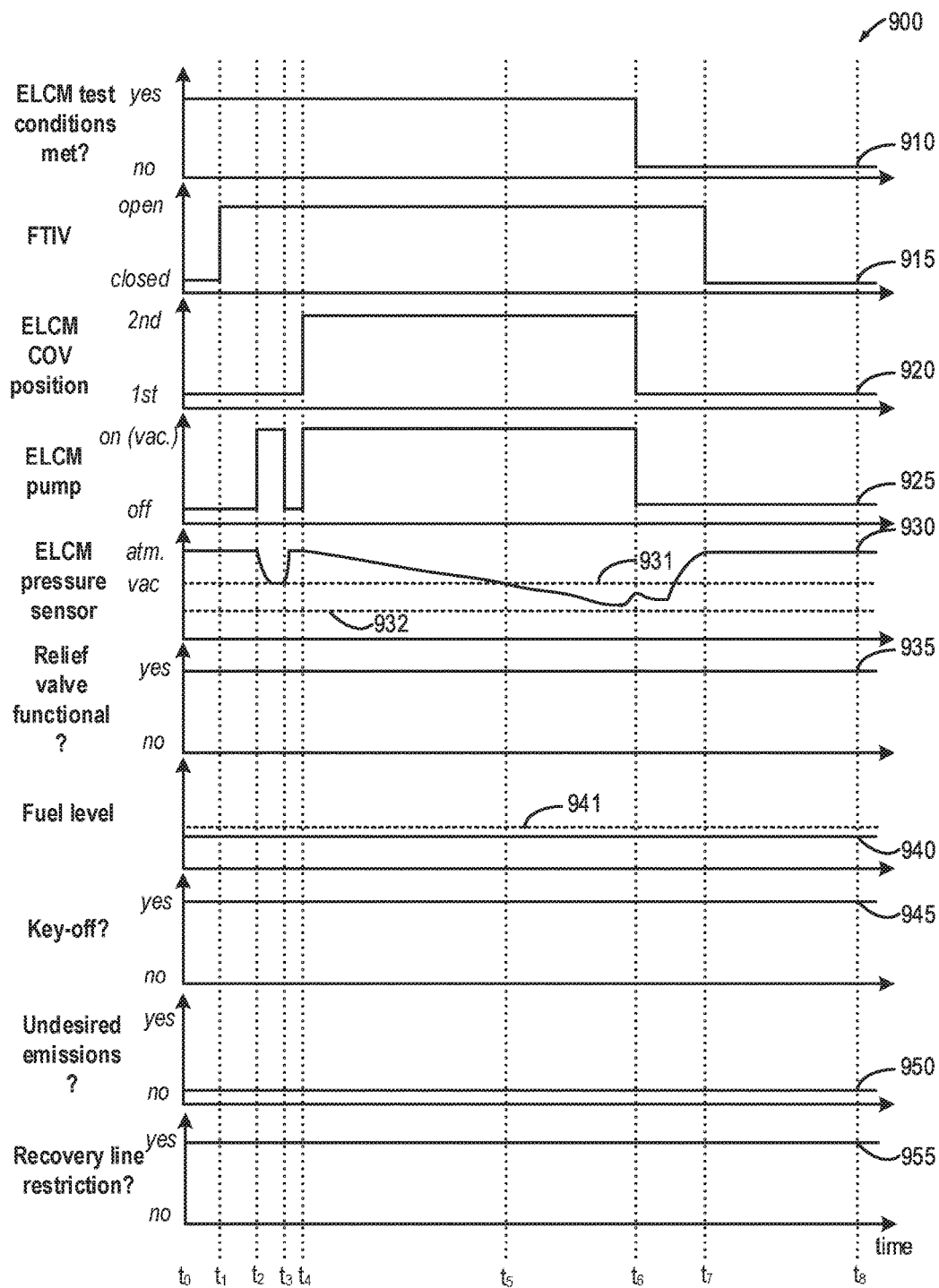
FIG. 9 shows an example timeline for conducting an evaporative emissions test diagnostic under conditions where a restriction is indicated in a fuel vapor recovery line, according to the method depicted at FIG. 8.

Turning now to FIG. 8, a high-level example method 800 is shown for taking mitigating actions with regard to tests for undesired evaporative emissions, responsive to an indication of a restricted (degraded) vapor recovery line (e.g. 31). More specifically, method 800 may be enabled responsive to indication of a restricted vapor recovery line (see step 455 of method 400), and may include only conducting an evaporative emissions test diagnostic on the fuel system and evaporative emissions system if a fuel level in a fuel tank of the vehicle is below a threshold fuel level. For example, the threshold fuel level may comprise a level of fuel below a spud valve (e.g. 54). In this way, by only conducting the evaporative emissions test when fuel level is below the threshold, the entire fuel system and evaporative emissions system may be diagnosed as to the presence or absence of undesired evaporative emissions, even though there is a restriction in the vapor recovery line.

Method 800 will be described with reference to the systems described herein and shown in FIG. 1, though it should be understood that similar methods may be applied to other systems without departing from the scope of this disclosure. Method 800 may be carried out by a controller, such as controller 12 in FIG. 1, and may be stored at the controller as executable instructions in non-transitory memory. Instructions for carrying out method 800 and the rest of the methods included herein may be executed by the controller based on instructions stored on a memory of the controller and in conjunction with signals received from sensors of the engine system, such as the sensors described above with reference to FIG. 1. The controller may employ fuel system and evaporative emissions system actuators such as the FTIV (e.g. 52) to fluidically couple the fuel system to the evaporative emissions system, the ELCM pump (e.g. 730) to apply vacuum on the evaporative emissions system and fuel system, etc., according to the methods described below.

Method 800 begins at 805 and may include evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Continuing to step 810, method 800 may include indicating whether entry conditions are met for conducting an ELCM-based evaporative emissions test procedure. As discussed, method 800 may be enabled responsive to an indication of a restricted vapor recovery line (e.g. 31). Thus, entry conditions being met at 810 may include an indication that fuel level in a fuel tank is below a fuel level threshold, where the fuel level threshold is at or slightly below a spud valve (e.g. 54). More specifically, with a restriction in the vapor recovery line, if vacuum is applied on the fuel system when the fuel level is above the spud valve, then the fuel filler system (e.g. 19, 19B) may go undiagnosed. However, with fuel level below the spud valve, applied vacuum on the fuel system may additionally be applied to the fuel filler system. In this way, the entire fuel system and evaporative emissions system may be diagnosed, even though a restriction has been indicated in the vapor recovery line.

Determining whether fuel level in the fuel tank is below the fuel level threshold may be a function of fuel level indicated by the fuel level sensor (e.g. 34). Determining whether fuel level in the fuel tank is below the fuel level threshold may further be a function of an angle, or compound angle, of the vehicle. For example, if the vehicle is parked on a hill, even though fuel level is low, fuel may still be above the spud valve. Thus, determining whether fuel level in the fuel tank is below the fuel level threshold may further be a function of inertial sensors (e.g. 199), which may be used to indicate vehicle angle or compound angle, and may further be a function of computer assisted models (CAD) of the fuel tank under conditions where the vehicle is parked on an incline/decline at various angles, etc. Such information may be stored at one or more lookup tables stored at the controller, for example. More specifically, fuel level may be first determined, and based on fuel level and data retrieved from inertial sensors, lookup tables based on CAD models of the fuel tank may be queried via the controller to indicate whether fuel level is below the spud valve for the particular instance.

Conditions being met at 810 may further include an engine-off status, or an engine-on status where it is further indicated that a purge operation is not occurring. Entry conditions may further include a duration of time since a previous ELCM test was conducted. It may be understood that a substantially equivalent method to method 800 may be used to diagnose a presence or absence of undesired evaporative emissions in a vehicle fuel system and evaporative emissions system under conditions where a restricted vapor recovery line is not indicated. In such an example, entry conditions being met may not include fuel level being below the fuel level threshold. In other words, entry conditions may be met for such a test (e.g. no restriction in the vapor recovery line), regardless of fuel level in the fuel tank.

If, at 810, conditions are not indicated to be met for conducting an ELCM-based test for undesired evaporative emissions, method 800 may proceed to 815. At 815, method 800 may include maintaining current vehicle operating conditions. For example, if the engine is in operation, engine operation may be maintained in its current operational status. If the engine is off, the engine may remain off If the vehicle is conducting a canister purging operation, the purging operation may be continued. Furthermore, the ELCM pump may be maintained in its current configuration, which may include maintaining a changeover valve (e.g. 715), in a first position with a pump (e.g. 730) deactivated, for example. In this way, the evaporative emissions system may be coupled to atmosphere. In such an example, it may be understood that the CVV (where included) may be maintained open. Method 800 may then end.

Returning to 810, if it is indicated that entry conditions are met (e.g. fuel level below the fuel level threshold) for conducting the ELCM test for undesired evaporative emissions, method 800 may proceed to 820. At 820, method 800 may include performing the evaporative emissions test. For example, at 820 an ELCM reference check may first be performed. As discussed herein with regard to FIG. 7A, an ELCM reference check may comprise placing (e.g. actuating via a command from the controller) or maintaining a COV (e.g. 715) in a first position, and activating (e.g. actuating via a command from the controller) an ELCM vacuum pump (e.g. 730). A pressure sensor (e.g. 57) may record the resulting vacuum level in the ELCM after a certain amount of time, or when the vacuum level has reached a plateau. The recorded vacuum level at the end of the reference check may be used as the reference vacuum level during conducting of the ELCM evaporative emissions test on the evaporative emissions system and fuel system, based on the reference orifice utilized for the reference check. In one example, the reference orifice may comprise a diameter of 0.02", but may be smaller or greater in diameter in other examples. For example, if a reference orifice of 0.02" is used for the reference check and a corresponding vacuum level is attained during the reference check, then during testing of the evaporative emissions control system and fuel system, if the vacuum level does not reach the vacuum level attained during the reference check, then it may be indicated that undesired evaporative emissions are escaping from an orifice greater than 0.02".

Subsequent to performing the reference test, if included, a FTIV (e.g. 52) may be commanded open (e.g. actuated open via a command from the controller), the canister vent valve (if included) may be commanded (e.g. actuated via a command from the controller) (or maintained) open, the COV 715 may be placed (e.g. actuated via a command from the controller) in the second position (solenoid 710 energized), and pump 730 may be activated. In this configuration, as pump 730 pulls a vacuum on the evaporative emissions control system and the fuel system, an absence of undesired evaporative emissions may allow for the vacuum level to reach or exceed the previously determined reference vacuum threshold. If, however, undesired evaporative emissions are escaping from an orifice diameter greater than that of the reference orifice, the pump may not pull down to the reference check vacuum level. The evacuation of the evaporative emissions control system and the fuel system may be executed until the reference vacuum is attained, for a predetermined time period, or for a time period based on current conditions.

Again, it may be understood that with fuel level below the fuel level threshold, applied vacuum on the fuel system and evaporative emissions system may additionally be applied to the fuel filler system, such that no regions of the fuel system and evaporative emissions system go undiagnosed in the presence of an indicated restriction in the vapor recovery line.

Continuing to 825, method 800 may include determining whether the vacuum level attained during the ELCM evaporative emissions test is greater than (e.g. more negative with respect to atmospheric pressure) or equal to the reference vacuum threshold attained during the reference check. If undesired emissions are detected (e.g., the vacuum did not reach the reference vacuum threshold during the evaporative emissions test), method 800 may proceed to 840. At 840, indicating undesired evaporative emissions may include setting a flag at the controller that the reference vacuum level was not attained during the ELCM evaporative emissions test, and may further include illuminating a malfunction indicator light (MIL). Furthermore, at 840, method 800 may include de-activating pump 730 and de-energizing solenoid 710 (to configure the COV in the first position) to relieve the applied vacuum. Following relieving the applied vacuum, in some examples the canister vent valve (where included) may be commanded closed, however in other examples the canister vent valve may be maintained open. Furthermore, if included, the FTIV may be commanded closed.

Method 800 may then proceed to 845 and may include updating vehicle operating parameters. In one example, a canister purge schedule may be updated to include information about the undesired evaporative emissions. For example, to reduce the amount of undesired evaporative emissions released to atmosphere, purging operations may be scheduled to be performed more frequently. Furthermore, purge operations (with the CPV open) may be performed with both the FTIV and the CVV open (where included) and/or with the ELCM COV in the first position with the ELCM pump off, to purge fuel vapors from both the canister and the fuel tank to engine intake. In other examples, at 845, updating vehicle operating parameters may include directing fuel tank vapors to the fuel vapor canister to be stored more frequently. For example, pressure in the fuel tank may be monitored, and responsive to an indication of fuel tank pressure greater than a threshold, the FTIV may be commanded open (with the CVV open where included and/or with ELCM COV in the first position), such that fuel tank vapors may be directed to the fuel vapor canister to be stored, reducing the amount of fuel vapors that may be released to the environment. Method 800 may then end.

While not explicitly shown, it may be understood that conducting a test for undesired evaporative emissions in a case where degradation or a restriction is not indicated in the vapor recovery line may comprise essentially the same steps as discussed above with regard to steps 820 to 825, with the exception being that the test may be conducted regardless of whether fuel level in the fuel tank is above, or below the fuel level threshold. In other words, it may be understood that testing for undesired evaporative emissions from the fuel system and/or evaporative emissions system may be conducted in a first mode when the vapor recovery line is degraded, and conducted in a second mode when the vapor recovery line is not degraded. Thus, testing for undesired evaporative emissions in the fuel system and/or the evaporative emissions system in both the first mode and the second mode may include sealing the fuel system and evaporative emissions system, fluidically coupling the fuel system to the evaporative emissions system (e.g. opening the FTIV), applying a negative pressure with respect to atmospheric pressure on the fuel system and evaporative emissions system, and indicating the presence of undesired evaporative emissions responsive to the negative pressure in the fuel system and evaporative emissions system not reaching a threshold negative pressure during applying the negative pressure. The difference between the first and second modes is thus that the testing for undesired evaporative emissions in the first mode is conducted responsive to fuel level in the fuel tank being below the fuel level threshold, whereas testing for undesired evaporative emissions in the second mode includes testing for undesired evaporative emissions regardless of fuel level in the fuel tank (e.g. above or below the fuel level threshold).

Returning to 825, responsive to an indication that the vacuum level attained during the ELCM evaporative emissions test is greater than (e.g. more negative) or equal to the reference vacuum threshold attained during the reference check, method 800 may proceed to 850. At 850, method 800 may include indicating whether the vehicle is equipped with a capless fuel filler system (e.g. 19B). If the vehicle system is not equipped with a capless fuel filler system, then method 800 may proceed to 855, and may include indicating an absence of undesired evaporative emissions. In other words, because vacuum in the fuel system and evaporative emissions system reached or exceeded the reference vacuum threshold attained during the reference check, it may be understood that the fuel cap is properly secured, and that the entire fuel system and evaporative emissions system are free from undesired evaporative emissions. Accordingly, such a result may be stored at the controller. Furthermore, applied vacuum in the fuel system and evaporative emissions system may be relieved, via deactivating pump 730 and de-energizing solenoid 710. If included, the canister vent valve may be maintained or commanded open to relieve the vacuum. Following relieving the applied vacuum, the canister vent valve may be commanded closed, or may be maintained open. Furthermore, if included, the FTIV may be commanded closed.

Proceeding to 860, method 800 may include updating vehicle operating parameters to reflect the passing result (e.g. no undesired evaporative emissions). Updating vehicle operating parameters at 860 may include maintaining a current canister purge schedule as is, and other vehicle operating parameters related to engine operation, hybrid operation, etc., may be maintained. Method 800 may then end.

Returning to 850, responsive to an indication that the vehicle is equipped with a capless fuel filler system (e.g. 19B), method 800 may proceed to 865. At 865, method 800 may include maintaining application of vacuum to the fuel system and evaporative emissions system, such that the vacuum level (e.g. negative pressure level with respect to atmospheric pressure) continues to build. Proceeding to 870, method 800 may include indicating whether a vacuum-release threshold is reached. More specifically, the vacuum-release threshold may comprise a vacuum level where a negative pressure relief valve (e.g. 64) associated with the capless fuel filler system opens. Such a vacuum level may comprise −20 InH2O, for example. However, the vacuum level may be less than or greater than −20 InH2O in some examples. For this example description, it may be understood that the vacuum level comprises −20 InH2O for opening the negative pressure relieve valve. Opening of the negative pressure relief valve may be indicated responsive to an inflection point in monitored pressure, indicating that the negative pressure on the fuel system and evaporative emissions system is being at least partially relieved via the opening of the pressure relief valve. If it is indicated at 870 that the vacuum-release threshold has been reached, method 800 may proceed to 855, and may include indicating an absence of undesired evaporative emissions in the fuel system and evaporative emissions system. Such a result may be stored at the controller, for example. More specifically, because the pressure relief valve was indicated to open, it may be understood that the entire fuel system and evaporative emissions system has been diagnosed as to the presence or absence of undesired evaporative emissions, even though there is a restriction present in the vapor recovery line (e.g. 31). In other words, indicating whether the pressure relief valve opens on a capless fuel filler system responsive to continued application of vacuum may serve to further confirm that the entire fuel system and evaporative emissions system (including the fuel filler system) have been properly diagnosed in the presence of a restricted vapor recovery line.

Furthermore, at 855, method 800 may include relieving vacuum in the fuel system and evaporative emissions system, as discussed above with regard to step 855.

Proceeding to 860, method 800 may include updating vehicle operating parameters. Updating vehicle operating parameters may be conducted as discussed above with regard to step 860. Method 800 may then end.

Returning to 870, if the vacuum-release threshold is not indicated to be reached during the applying vacuum on the fuel system and evaporative emissions system, method 800 may proceed to 875, and may include setting an appropriate flag at the controller. More specifically, if the vacuum where the negative pressure relief valve is expected to open (e.g. −20 InH2O) is reached, but the pressure relief valve is not indicated to open (e.g. lack of observed inflection point while monitoring pressure in the fuel system and evaporative emissions system), then it may be indicated that the pressure relief valve is stuck closed or that there may be a restriction in the fuel filler system such that even though fuel level is below the spud valve, something is preventing applied vacuum from reaching the capless pressure relief valve. Regardless of the source of why the vacuum did not result in the pressure relief valve opening, a malfunction indicator light (MIL) may be illuminated on a dash of the vehicle, for example, alerting the vehicle operator of the need to service the vehicle.

Furthermore, at 875, method 800 may include relieving the applied vacuum in the fuel system and evaporative emissions system. Relieving the applied vacuum may be conducted as discussed above with regard to steps 840 and 855, for example.

Proceeding to 880, method 800 may include updating vehicle operating parameters to reflect either the presence of a restriction in the fuel filler system thus preventing applied vacuum from reaching the pressure relief valve in the capless fuel filler system, or that the pressure relief valve is stuck closed. For example, evaporative emissions tests specific to testing the fuel filler system (e.g. with fuel level below the fuel level threshold), may be suspended until the source of the failure to open the negative pressure relieve valve is mitigated. Method 800 may then end.

Turning now to FIG. 9, an example timeline 900 is shown for conducting an evaporative emissions test procedure under conditions where a vapor recovery line is restricted (e.g. degraded), according to the methods described herein and with reference to FIG. 4 and FIG. 8, and as applied to the systems described herein and with reference to FIG. 1. Timeline 900 includes plot 910, indicating whether conditions are met (yes) or not (no) for conducting an ELCM-based test for undesired evaporative emissions on the vehicle fuel system and evaporative emissions system. Timeline 900 further includes plot 915, indicating whether a FTIV (e.g. 52) is open, or closed, over time. Timeline 900 further includes plot 920, indicating whether an ELCM changeover valve (COV) is configured in a first position (e.g. FIG. 7A or 7C), or a second position (e.g. FIG. 7B), over time. Timeline 900 further includes plot 925, indicating whether an ELCM pump (e.g. 730) is on (where it may be understood that being on in this example means providing vacuum, or negative pressure with respect to atmospheric pressure), or off, over time. Timeline 900 further includes plot 930 indicating pressure in the fuel system and evaporative emissions system, as monitored via an ELCM pressure sensor (e.g. 57), over time. In some examples, pressure may be additionally or alternatively monitored via a fuel tank pressure transducer (e.g. 91). Line 931 represents a first threshold vacuum level, indicating a vacuum level corresponding to vacuum attainable across a reference orifice (e.g. 740) of specified dimensions. Line 932 represents a second threshold vacuum level, indicating a level of vacuum expected to open a vacuum-actuated negative pressure relieve valve (e.g. 64) on a capless fuel filler system (e.g. 19B). Timeline 900 further includes plot 935, indicating whether the negative pressure relief valve is functional (yes) or not (no), over time.

Timeline 900 further includes plot 940, indicating fuel level in a fuel tank of the vehicle, over time. Line 941 represents a fuel level threshold, below which it may be understood that fuel level is below the level of a spud valve (e.g. 54). Timeline 900 further includes plot 945, indicating whether the vehicle is in a key-off state (yes) or not (no), over time. Timeline 900 further includes plot 950, indicating whether undesired evaporative emissions are indicated to be present (yes) or not (no) in the vehicle fuel system and evaporative emissions system, over time. Timeline 900 further includes plot 955, indicating whether there is a restriction (yes) or not (no) in a vapor recovery line (e.g. 31), over time.

At time t0, the vehicle is in a key-off condition (plot 945), and there is an indication of a restriction in the vapor recovery line (plot 955). Undesired evaporative emissions are not already indicated to be present in the fuel system and/or evaporative emissions system (plot 950). The FTIV is in a closed configuration (plot 915), thus the fuel system is sealed from the evaporative emissions system. The ELCM COV (e.g. 715) is in the first position (plot 920), and the ELCM pump (e.g. 730) is off (plot 925). Accordingly, the ELCM pressure sensor (e.g. 57) is reading near atmospheric pressure (plot 930).

Conditions are indicated to be met for conducting an ELCM-based test for undesired evaporative emissions stemming from the fuel system and/or evaporative emissions system (plot 910). More specifically, because there is a recovery line restriction (plot 955), conditions for conducting the ELCM-based test may only be met responsive to fuel level (plot 940) below a fuel level threshold, represented by line 941. Still further, the vehicle system includes a capless fuel filler system (e.g. 19B), and as yet there is no indication that the pressure relief valve is not functioning as desired (plot 935).

With conditions indicated to be met for conducting the ELCM-based test for undesired evaporative emissions, at time t1 the FTIV is commanded open to couple the fuel system to the evaporative emissions system. At time t2, with the ELCM COV configured in the first position, the ELCM pump is activated. As described above with regard to FIG. 7A, in this position the ELCM pump (e.g. 730) may draw a vacuum on reference orifice (e.g. 740), and pressure sensor (e.g. 57) may record the vacuum level within the ELCM (e.g. 56). This reference check vacuum level reading may then become the threshold for passing the subsequent ELCM evaporative emissions test. Accordingly, between time $t_2$ and $t_3$ vacuum level as monitored by the ELCM pressure sensor builds to a first threshold level, represented by line 931. At time $t_3$, the ELCM pump is deactivated and the pressure returns to atmospheric pressure between time $t_3$ and $t_4$.

With the reference check vacuum level reading conducted, at time t4 the ELCM COV is commanded (actuated) to the second position, as discussed above with regard to FIG. 7B, and the ELCM pump is turned on in vacuum mode. Accordingly, between time t4 and t5, vacuum (e.g. negative pressure with respect to atmospheric pressure) builds in the fuel system and evaporative emissions system. More specifically, because there is a restriction indicated in the vapor recovery line (e.g. 31), and because the ELCM-based test is being conducted with fuel level below the fuel level threshold (e.g. below the spud valve), the entire fuel system and evaporative emissions system (including the fuel filler system) may be evacuated via the vacuum.

At time t5, the vacuum build reaches the first threshold vacuum level, represented by line 931. However, in a case where there is a restriction in the fuel filler system, or if the spud valve is not functioning as desired, then vacuum may still build to the first threshold (line 931), but in such an example the fuel filler system may go undiagnosed. However, it may be understood that the vehicle system for which example timeline 900 pertains to, includes a capless fuel filler system (e.g. 19B), with a pressure relief valve (e.g. 54). As there is no indication as yet that the pressure relief valve is not functioning as desired, it may be understood that it may be confirmed as to whether the entire fuel system and evaporative emissions system have been properly diagnosed (including the fuel filler system). Thus, between time t5 and t6, the ELCM pump remains on (plot 925), and vacuum continues to build.

At time t6, an inflection point in the vacuum build is indicated, which may be understood to be indicative of the pressure relief valve opening. Thus, it may be understood that the vacuum build was communicated through the fuel tank, through the spud valve, and to the pressure relief valve of the capless fuel filler system. Thus, no undesired evaporative emissions are indicated, and furthermore, it may be indicated that the pressure relief valve is functioning as desired. Such indications may be stored as flags set at the controller, for example.

Responsive to the indication that the vacuum was communicated to the pressure relief valve, and further responsive to an indication of an absence of undesired evaporative emissions in the fuel system and evaporative emissions system, test conditions are no longer indicated to be met (plot 910). Accordingly, the ELCM COV is actuated to the first position (plot 920), and the ELCM pump is deactivated (plot 925). With the ELCM COV in the first position with the pump deactivated, and with the FTIV maintained open (plot 915), pressure in the fuel system and evaporative emissions system returns to atmospheric pressure (plot 930). Responsive to pressure in the fuel system and evaporative emissions system reaching atmospheric pressure, the FTIV is actuated closed at time t7. Between time t7 and t8 the vehicle is maintained in a key-off state (plot 945).

While not explicitly indicated at example timeline 900, it may be understood that the controller is awake for conducting the test for undesired evaporative emissions, although the vehicle is in a key-off event. In some examples, the controller may transition to the awake mode responsive to conditions being met for conducting the ELCM-based test, after a vehicle timer expires, etc. In other examples, the controller may be maintained awake for a duration long enough to conduct the ELCM-based test. In any event, it may be understood that the controller is awake to conduct the ELCM-based test for undesired evaporative emissions on the vehicle fuel system and evaporative emissions system.

In this way, in the event of a restriction in a fuel system vapor recovery line, mitigating actions may be taken to ensure that an entirety of a vehicle fuel system and evaporative emissions system is diagnosed as to the presence or absence of undesired evaporative emissions, even though there is a restricted portion. In doing so, completion rates for evaporative emissions test procedures may be increased, and undesired evaporative emissions may be reduced.

The technical effect is to recognize that in a case where a vapor recovery line is restricted, the entirety of a fuel system and evaporative emissions system, including a fuel filler system, may be readily diagnosed as long at the fuel system and evaporative emissions system is evacuated under conditions where fuel level in the fuel tank is below a spud valve. When below the spud valve, vacuum supplied via the ELCM pump may be effectively communicated to the fuel filler system. In this way, the entire fuel system and evaporative emissions system may be diagnosed even when a restriction is present in the fuel vapor recovery line.

Another technical effect is to recognize that a pressure relief valve that is part of a capless fuel filler system may be used as a readout as to whether the entire fuel system and evaporative emissions system was evacuated, or diagnosed, via the ELCM-based approach. Specifically, by continuing to apply vacuum on the fuel system after a first threshold (e.g. a threshold set via drawing a vacuum across a reference orifice in the ELCM) is reached, the vacuum may build to a point where the pressure relief valve is opened. If the pressure relief valve is opened via communicating vacuum from the ELCM to the fuel filler system, then it may be understood that the entire fuel system and evaporative emissions system (including the fuel filler system) is being diagnosed as desired.

In another embodiment, the inventors have herein recognized that other examples of tests for the presence or absence of undesired evaporative emissions may be conducted in similar fashion to that described above, under conditions where a restriction is indicated in the vapor recovery line. More specifically, an evaporative emissions test may include communicating engine intake manifold vacuum to the fuel system and evaporative emissions system to indicate a presence or absence of undesired evaporative emissions. More specifically, when conditions are met for conducting an engine-based diagnostic, the controller may command open a CPV and an FTIV, and may command closed a CVV (or command an ELCM COV to the second position). Configured as such, engine vacuum may be communicated to the fuel system and evaporative emissions system. Similar to that described above, in a case where there is a restriction indicated in the vapor recovery line, such a test for undesired evaporative emissions may be conducted only under circumstances where fuel level is below the spud valve, such that the entire fuel system and evaporative emissions system (including the fuel filler system) may be diagnosed for the presence or absence of undesired evaporative emissions. In a case where the fuel filler system comprises a capless fuel filler system with a pressure relief valve, the pressure relief valve may similarly be used as an indicator as to whether vacuum was effectively communicated to the fuel filler system.

In still another embodiment, it may be understood that for a fuel system such as that depicted at FIG. 1, that includes a FTIV for sealing off the fuel system, there may be conditions where vacuum passively develops in the fuel tank. For example, during the course of a diurnal cycle, where temperatures rise and fall in a predictable fashion, when temperatures are decreasing, vacuum may develop in the fuel tank. A vacuum build greater than a threshold may indicate that the fuel system is free from undesired evaporative emissions. In a case where a restriction is indicated in the vapor recovery line, it may be beneficial to monitor passive vacuum builds in the fuel system under conditions where fuel level is below the spud valve. For example, if fuel is below the spud valve, and vacuum builds in the fuel system, it may be understood that vacuum may additionally build in the fuel filler system. If the vacuum build reaches a threshold indicative of an absence of undesired evaporative emissions under such conditions, it may be indicated that the fuel system (and fuel filler system) are free from undesired evaporative emissions. Then, an ELCM-based approach or engine-based approach may be used to diagnose the evaporative emissions system downstream of the FTIV valve, by communicating vacuum to the evaporative emissions system with the FTIV closed, and with the CVV closed (or with the ELCM COV configured in the second position). In this way, both the fuel system and the evaporative emissions system may be diagnosed, even under circumstances where the vapor recovery line is restricted. In yet another embodiment a method may comprise indicating degradation of a vapor recovery line configured to circulate and/or hold a percentage of refueling vapors, based on a steady-state pressure in the vapor recovery line during a refueling event, and adjusting a test for a presence or absence of undesired evaporative emissions stemming from a fuel system and an evaporative emissions system based on the indicated degradation of the vapor recovery line. In such an example, adjusting the test may include conducting the test responsive to a fuel level in a fuel tank of the vehicle below a threshold fuel level, instead of conducting the test regardless of the fuel level in the fuel tank. The method may further include wherein when the fuel level is greater than the threshold fuel level and the vapor recovery line is degraded, a portion of the fuel system is isolated from another portion of the fuel system. In one example, the portion of the fuel system that is isolated may include a fuel filler system of the fuel system. In one example, the threshold fuel level is below a valve positioned in the fuel tank, where the valve couples to a fuel filler neck, and where the valve is configured to open responsive to negative pressure in the fuel tank.

In such an embodiment, the test for the presence or absence of undesired evaporative emissions may further comprise sealing the fuel system and evaporative emissions system, fluidically coupling the fuel system to the evaporative emissions system, applying a negative pressure on the fuel system and evaporative emissions system, and indicating the presence of undesired evaporative emissions responsive to the negative pressure in the fuel system and evaporative emissions system not reaching a threshold negative pressure during applying the negative pressure.

In such an embodiment, indicating degradation of the vapor recovery line based on the steady-state pressure in the vapor recovery line during the refueling event may further comprise indicating that vapor recovery line pressure is not within a threshold of expected vapor recovery line pressure during the refueling event.

In such an embodiment, the method may further comprise indicating a fuel vapor canister load of a fuel vapor canister positioned in the evaporative emissions system, based on the steady-state pressure in the vapor recovery line during the refueling event. In one example, indicating the fuel vapor canister load is further based on a rate of fuel dispensation during the refueling event, wherein the fuel vapor canister load increases as the steady-state pressure in the vapor recovery line decreases.

The systems described herein and with regard to FIG. 1 along with the method described herein and with regard to FIG. 4 may enable one or more systems and one or more methods. In one example, a method is provided, comprising indicating a fuel vapor canister load based on a steady-state pressure in a vapor recovery line during a refueling event; and adjusting a canister purging operation in response to the indicated fuel vapor canister load. In such an example, the method may additionally or alternatively comprise adjusting a canister purge schedule for a fuel vapor canister based on the indicated fuel vapor canister load. In any of the preceding examples, the method may additionally or alternatively comprise indicating degradation of the vapor recovery line based on the steady-state pressure in the vapor recovery line during the refueling event. In any of the preceding examples, the method may additionally or alternatively comprise indicating a fuel vapor canister loading rate based on the steady-state pressure in the vapor recovery line during the refueling event. In some examples, the fuel vapor canister loading rate may additionally or alternatively be based on a rate of fuel dispensation during the refueling event. In some examples, the rate of fuel dispensation during the refueling event may additionally or alternatively be based on an output of a fuel level indicator over time. In any of the preceding examples where a fuel vapor canister loading rate is indicated, the fuel vapor canister loading rate may additionally or alternatively be based on a volume of the vapor recovery line. In any of the preceding examples where a fuel vapor canister loading rate is indicated, the fuel vapor canister loading rate may additionally or alternatively be based on a maximum fuel vapor canister loading rate, the maximum fuel vapor canister loading rate may additionally or alternatively be based on a fuel vapor canister loading rate wherein no circulation of fuel vapor through the vapor recovery line takes place during the refueling event. In any of the preceding examples, the fuel vapor canister load may additionally or alternatively be based on the fuel vapor canister load prior to the refueling event. The technical result of implementing this method is that an accurate canister load may be determined following a refueling event, and canister purging operations adjusted accordingly.

In another example, a fuel system for a vehicle is provided, comprising a fuel tank coupled to a fuel vapor canister, a fuel filler neck coupled to the fuel tank, a vapor recovery line coupled between the fuel tank and the fuel filler neck, a vapor recovery line pressure sensor coupled within the vapor recovery line, and a controller with instructions stored in non-transitory memory, that when executed cause the controller to monitor pressure in the vapor recovery line during a refueling event, and indicate a fuel vapor canister load based on a steady-state vapor recovery line pressure during the refueling event. In such an example, a fuel level indicator may additionally or alternatively be coupled within the fuel tank, and the controller may additionally or alternatively be configured with instructions in non-transitory memory, that when executed cause the controller to indicate a rate of fuel dispensation based on an output of the fuel level indicator during the refueling event, and indicate the fuel vapor canister load based on the rate of fuel dispensation. In any of the preceding examples, the controller may additionally or alternatively be configured with instructions in non-transitory memory, that when executed cause the controller to indicate an expected vapor recovery line pressure based on the rate of fuel dispensation, and indicate degradation of the vapor recovery line responsive to the steady-state vapor recovery line pressure being less than the expected vapor recovery line pressure by more than a threshold. In any of the preceding examples, the controller may additionally or alternatively be configured with instructions in non-transitory memory, that when executed cause the controller to: responsive to the steady-state vapor recovery line pressure being within a threshold of than the expected vapor recovery line pressure, indicate the fuel vapor canister load based on an expected fuel vapor canister loading rate. In some examples, the expected fuel vapor canister loading rate may additionally or alternatively be based on a volume of the vapor recovery line. In any of the preceding examples, the vapor recovery line may additionally or alternatively be configured to hold 20% of refueling vapors within the fuel system during a steady-state portion of the refueling event. In any of the preceding examples, the maximum fuel vapor canister loading rate may additionally or alternatively be based on zero circulation of fuel vapor through the vapor recovery line takes place during the refueling event. In any of the preceding examples the fuel vapor canister loading rate may additionally or alternatively be based on a sum of the expected fuel vapor canister loading rate and a product of the maximum fuel vapor canister loading rate and a percent restriction of the vapor recovery line. In any of the preceding examples, the percent restriction of the vapor recovery line may additionally or alternatively be based on the expected vapor recovery line pressure and the steady-state vapor recovery line pressure during the refueling event. The technical result of implementing this system is the diagnosis and quantification of a percent restriction of a vapor recovery line. In this way, downstream operations may be adjusted based on an accurate canister load following a refueling event.

In yet another example, method for a fuel system is provided, comprising responsive to a refueling request, opening a fuel tank isolation valve coupled between a fuel tank and a fuel vapor canister, indicating a pre-refueling canister load based on a canister load and a fuel tank pressure prior to opening the fuel tank isolation valve, monitoring a fuel level over time and a pressure in a vapor recovery line over time during a refueling event, indicating a rate of fuel vapor canister loading based on a steady-state fuel level rate of change and further based on a steady-state vapor recovery line pressure during the refueling event, indicating an updated canister load based on the pre-refueling canister load and the rate of fuel vapor canister loading during the refueling event, and updating a canister purge schedule based on the updated canister load. In such an example, the method may additionally or alternatively comprise indicating an expected vapor recovery line pressure based on the steady-state fuel level rate of change during the refueling event, indicating degradation of the vapor recovery line responsive to the steady-state vapor recovery line pressure during the refueling event being less than the expected vapor recovery line pressure by more than a threshold, adjusting the rate of fuel vapor canister loading based on the indicated degradation of the vapor recovery line, and indicating the updated canister load based on the adjusted rate of fuel vapor canister loading. The technical result of implementing this method is a reduction in bleed emissions, as the canister loading status may otherwise be underestimated based on an expected canister loading rate that does not take vapor recovery line degradation into account.

The systems described herein and with regard to FIG. 1 along with the methods described herein and with regard to FIG. 4 and FIG. 8, may enable an additional one or more systems and one or more methods. In one example, a method is provided, comprising testing for undesired evaporative emissions from a fuel system and/or an evaporative emissions system in a first mode when a vapor recovery line, configured to circulate and/or hold a percentage of refueling vapors, is degraded as determined by a steady-state pressure in the vapor recovery line during a refueling event; and testing for the undesired evaporative emissions in a second mode when the vapor recovery line is not degraded. In a first example of the method, the method further includes wherein testing for undesired evaporative emissions from the fuel system and/or the evaporative emissions system in the first mode includes conducting the test responsive to a fuel level in a fuel tank of the vehicle below a threshold fuel level; and wherein testing for undesired evaporative emissions from the fuel system and/or the evaporative emissions system in the second mode includes conducting the test responsive to the fuel level in the fuel tank being either greater than, or less than, the threshold fuel level. A second example of the method optionally includes the first example, and further includes wherein when the fuel level is greater than the threshold fuel level and the vapor recovery line is degraded, a portion of the fuel system is isolated from another portion of the fuel system. A third example of the method optionally includes any one or more or each of the first and second examples, and further includes wherein the portion of the fuel system that is isolated includes a fuel filler system of the fuel system. A fourth example of the method optionally includes any one or more or each of the first through third examples, and further includes wherein the threshold fuel level is below a valve positioned in the fuel tank, where the valve couples to a fuel filler neck, and where the valve is configured to open responsive to negative pressure in the fuel tank. A fifth example of the method optionally includes any one or more or each of the first through fourth examples, and further includes wherein testing for undesired evaporative emissions in the fuel system and/or the evaporative emissions system in both the first mode and the second mode further comprises: sealing the fuel system and evaporative emissions system; fluidically coupling the fuel system to the evaporative emissions system; applying a negative pressure with respect to atmospheric pressure on the fuel system and evaporative emissions system; and indicating the presence of undesired evaporative emissions responsive to the negative pressure in the fuel system and evaporative emissions system not reaching a threshold negative pressure during applying the negative pressure. A sixth example of the method optionally includes any one or more or each of the first through fifth examples, and further includes wherein determining the vapor recovery line is degraded further comprises indicating that the steady-state pressure in the vapor recovery line is not within a threshold of an expected vapor recovery line pressure during the refueling event. A seventh example of the method optionally includes any one or more or each of the first through sixth examples, and further comprises indicating a fuel vapor canister load of a fuel vapor canister positioned in the evaporative emissions system, based on the steady-state pressure in the vapor recovery line during the refueling event. An eighth example of the method optionally includes any one or more or each of the first through seventh examples, and further includes wherein indicating the fuel vapor canister load is further based on a rate of fuel dispensation during the refueling event; and wherein the fuel vapor canister load increases as the steady-state pressure in the vapor recovery line decreases.

Another example of a method comprises monitoring a fuel dispense rate of fuel into a fuel tank positioned in a fuel system of a vehicle, during a refueling event; monitoring pressure in a vapor recovery line configured to circulate and/or hold a percentage of refueling vapors, during the refueling event; indicating a restriction in the vapor recovery line based on an expected pressure in the vapor recovery line differing by a threshold amount from monitored pressure during the refueling event, where the expected pressure is based on the fuel dispense rate; and adjusting entry conditions for conducting a test for a presence or absence of undesired evaporative emissions on the fuel system and an evaporative emissions system of the vehicle responsive to the restriction in the vapor recovery line being indicated. In a first example of the method, the method further includes wherein adjusting entry conditions further comprises: indicating conditions are met for conducting the test for the presence or absence of undesired evaporative emissions on the fuel system and evaporative emissions system provided that at least a fuel level in the fuel tank is below a fuel level threshold. A second example of the method optionally includes the first example, and further includes where the fuel level threshold is below a valve positioned in the fuel tank, where the valve is configured to open under negative pressure in the fuel tank, and where the valve is coupled to a fuel filler neck. A third example of the method optionally includes any one or more or each of the first and second examples, and further includes wherein the test for the presence or absence of undesired evaporative emissions further comprises: sealing the fuel system and evaporative emissions system; fluidically coupling the fuel system to the evaporative emissions system; applying a negative pressure on the fuel system and evaporative emissions system; and indicating the presence of undesired evaporative emissions responsive to the negative pressure in the fuel system and evaporative emissions system not reaching a threshold negative pressure during applying the negative pressure. A fourth example of the method optionally includes any one or more or each of the first through third examples, and further includes wherein indicating the restriction in the vapor recovery line further comprises setting a malfunction indicator light to notify a vehicle operator of a need to service the vehicle. A fifth example of the method optionally includes any one or more or each of the first through fourth examples, and further comprises during the refueling event, indicating a canister load of a fuel vapor canister positioned in the evaporative emissions system, where indicating the canister load is a function of the fuel dispense rate and monitored pressure in the vapor recovery line.

An example of a system for a vehicle comprises a fuel tank configured within a fuel system, the fuel tank including a fuel level sensor; a fuel vapor canister, configured within an evaporative emissions control system, selectively fluidically coupled to the fuel tank via a fuel tank isolation valve; an evaporative level check monitor, the evaporative level check monitor including a vacuum pump and a pressure sensor; a fuel filler neck coupled to the fuel tank, the fuel filler neck configured in a fuel filler system; a spud valve positioned in the fuel tank, and configured to open under negative pressure in the fuel tank with respect to atmospheric pressure; a fuel filler neck coupled to the fuel tank; a vapor recovery line coupled between the fuel tank and the fuel filler neck; a vapor recovery line pressure sensor coupled within the vapor recovery line; and a controller storing instructions in non-transitory memory that, when executed, cause the controller to: monitor pressure in the vapor recovery line during a refueling event via the vapor recover line pressure sensor; monitor fuel level in the fuel tank during the refueling event via the fuel level sensor to indicate a rate of fuel dispensation during the refueling event; indicate a fuel vapor canister load based on a steady-state vapor recovery line pressure during the refueling event; indicate a restriction in the vapor recovery line based on the steady-state pressure during the refueling event; and responsive to an indication of the restriction in the vapor recovery line, adjust a test for a presence or absence of undesired evaporative emissions in the fuel system and/or evaporative emissions system. In a first example of the system, the system further includes wherein the controller is further configured with instructions in non-transitory memory, that when executed cause the controller to: indicate an expected vapor recovery line pressure based on the rate of fuel dispensation; and indicate the restriction in the vapor recovery line responsive to the steady-state vapor recovery line pressure being less than the expected vapor recovery line pressure by more than a threshold during the refueling event. A second example of the system optionally includes the first example, and further includes wherein the controller stores further instructions to indicate the fuel vapor canister load as a function of the expected vapor recovery line pressure. A third example of the system optionally includes any one or more or each of the first through second examples, and further includes wherein the controller stores further instructions to conduct the test for undesired evaporative emissions responsive to fuel level being below the spud valve, where the restriction in the vapor recovery line is indicated. A fourth example of the system optionally includes any one or more or each of the first through third examples, and further includes wherein the controller stores further instructions to, responsive to conditions being met to conduct the test for undesired evaporative emissions and where the restriction in the vapor recovery line is indicated: determine a reference vacuum threshold by drawing a vacuum via the vacuum pump on a reference orifice; evacuate the evaporative emissions control system and fuel system by commanding open the fuel tank isolation valve and activating the vacuum pump; indicate an absence of undesired evaporative emissions responsive to a vacuum build equal to or greater than the reference vacuum threshold, wherein evacuating the evaporative emissions system and fuel system further comprises evacuating the fuel filler system via the spud valve opening responsive to negative pressure applied on the fuel tank. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method, comprising:
monitoring a fuel dispense rate of fuel into a fuel tank positioned in a fuel system of a vehicle during a refueling event;
monitoring pressure in a vapor recovery line configured to circulate and/or hold a percentage of refueling vapors during the refueling event;
indicating a restriction in the vapor recovery line based on an expected pressure in the vapor recovery line differing by a threshold amount from monitored pressure during the refueling event, where the expected pressure is based on the fuel dispense rate; and adjusting entry conditions for conducting a test for a presence or absence of undesired evaporative emissions on the fuel system and an evaporative emissions system of the vehicle responsive to the restriction in the vapor recovery line being indicated.

2. The method of claim 1, wherein adjusting entry conditions further comprises:

indicating conditions are met for conducting the test for the presence or absence of undesired evaporative emissions on the fuel system and evaporative emissions system provided that at least a fuel level in the fuel tank is below a fuel level threshold.

3. The method of claim 2, where the fuel level threshold is below a valve positioned in the fuel tank, where the valve is configured to open under negative pressure in the fuel tank, and where the valve is coupled to a fuel filler neck.

4. The method of claim 1, wherein the test for the presence or absence of undesired evaporative emissions further comprises:

sealing the fuel system and the evaporative emissions system;

fluidically coupling the fuel system to the evaporative emissions system;

applying a negative pressure on the fuel system and the evaporative emissions system; and indicating the presence of undesired evaporative emissions responsive to the negative pressure in the fuel system and the evaporative emissions system not reaching a threshold negative pressure during applying the negative pressure.

5. The method of claim 1, wherein indicating the restriction in the vapor recovery line further comprises setting a malfunction indicator light to notify a vehicle operator of a need to service the vehicle, and wherein the test for the presence or absence of undesired evaporative emissions includes when the vapor recovery line is degraded and when the vapor recovery line is not degraded.

6. The method of claim 1, further comprising, during the refueling event, indicating a canister load of a fuel vapor canister positioned in the evaporative emissions system, where indicating the canister load is a function of the fuel dispense rate and the monitored pressure in the vapor recovery line.

\* \* \* \* \*